(12) United States Patent
Higuchi et al.

(10) Patent No.: US 8,310,116 B2
(45) Date of Patent: Nov. 13, 2012

(54) BRUSHLESS MOTOR AND MANUFACTURING METHOD THEREOF

(75) Inventors: Takuya Higuchi, Hamamatsu (JP);
Hiroyuki Mizutani, Hamamatsu (JP);
Kouhei Shibata, Kosai (JP); Fumio Fukuno, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 122 days.

(21) Appl. No.: 13/012,076

(22) Filed: Jan. 24, 2011

(65) Prior Publication Data

US 2011/0187223 A1 Aug. 4, 2011

(30) Foreign Application Priority Data

Feb. 4, 2010 (JP) .................................. 2010-23484
Feb. 4, 2010 (JP) .................................. 2010-23485

(51) Int. Cl.
*H02K 5/24* (2006.01)
(52) U.S. Cl. ........................................................ 310/51
(58) Field of Classification Search ............... 310/51, 310/43, 91
See application file for complete search history.

(56) References Cited

U.S. PATENT DOCUMENTS

| | | | | |
|---|---|---|---|---|
| 4,647,803 A | * | 3/1987 | von der Heide et al. | ......... 310/51 |
| 5,619,389 A | * | 4/1997 | Dunfield et al. | ......... 360/98.07 |
| 5,949,613 A | * | 9/1999 | Moir et al. | ................. 360/99.08 |
| 6,809,898 B1 | * | 10/2004 | Prochazka | ................. 360/99.08 |
| 6,844,636 B2 | * | 1/2005 | Lieu et al. | ......... 310/43 |
| 7,659,644 B2 | | 2/2010 | Fukuno et al. | |
| 7,745,964 B2 | | 6/2010 | Fukuno et al. | |
| 2008/0218009 A1 | | 9/2008 | Fukuno et al. | |
| 2008/0296985 A1 | | 12/2008 | Fukuno et al. | |

FOREIGN PATENT DOCUMENTS

CN 2852504 12/2006

OTHER PUBLICATIONS

Office Action dated Jun. 2, 2011 in corresponding GB application No. 1101901.5.

* cited by examiner

*Primary Examiner* — Nguyen N Hanh
(74) *Attorney, Agent, or Firm* — Posz Law Group, PLC

(57) ABSTRACT

Each of vibration dampers is separated from each circumferentially adjacent one of the vibration dampers upon cutting of each of a plurality of connectors, which is initially integrally formed with the vibration dampers to circumferentially join between corresponding circumferentially adjacent two of the vibration dampers to form a single closed loop body. At least a part of each of first and second circumferential end portions of each vibration damper is engaged with a corresponding one of outer protrusions of a centerpiece in a circumferential direction of a stator. A primary recess is radially inwardly recessed at an outer peripheral portion of the vibration damper and is engaged with a corresponding one of primary protrusions of the stator in the circumferential direction of the stator.

16 Claims, 22 Drawing Sheets

BRUSHLESS MOTOR AND MANUFACTURING METHOD THEREOF

CROSS REFERENCE TO RELATED APPLICATION

This application is based on and incorporates herein by reference Japanese Patent Application No. 2010-23484 filed on Feb. 4, 2010 and Japanese Patent Application No. 2010-23485 filed on Feb. 4, 2010.

BACKGROUND OF THE INVENTION

1. Field of the Invention

The present invention relates to a brushless motor and a manufacturing method thereof.

2. Description of Related Art

Japanese Unexamined patent Publication No. 2008-259407A (corresponding to U.S. Pat. No. 7,659,644B2) teaches a brushless motor, which includes a single vibration damper (vibration isolator) that is made of rubber or resin and is configured into an annular form extending in a circumferential direction of a stator. In this brushless motor, the vibration damper includes inner peripheral recesses, primary recesses (first-side outer peripheral recesses) and secondary recesses (second-side outer peripheral recesses). The inner peripheral recesses of the vibration damper are engaged with outer protrusions, respectively, of the centerpiece. The primary recesses of the vibration damper are engaged with primary protrusions (first-side inner peripheral protrusions), respectively, of the stator, and the secondary recesses of the vibration damper are engaged with secondary protrusions (second-side inner peripheral protrusions), respectively, of the stator.

In the brushless motor of Japanese Unexamined patent Publication No. 2008-259407A, each one of the primary recesses and adjacent one of the secondary recesses of the vibration damper are circumferentially placed between corresponding circumferentially adjacent two of the inner peripheral recesses of the vibration damper. Therefore, in this vibration damper, a volume of a shock absorbing portion, i.e., a damping portion (thick wall portion), which is circumferentially defined between the corresponding inner peripheral recess and the primary recess or the secondary recess, may possibly become insufficient for damping the vibrations in some cases. Therefore, in order to improve the vibration damping performance of the vibration damper, there is required a further improvement.

Furthermore, in the brushless motor that includes the vibration damper, which is held between the stator and the centerpiece and resiliently supports the stator relative to the center piece, it is desirable to achieve a good weight balance of the stator relative to the centerpiece.

Japanese Unexamined Patent Publication No. 2008-301622A (corresponding to U.S. Pat. No. 7,745,964B2) teaches a brushless motor having a plurality of vibration dampers (vibration absorbing members), each of which is made of a metal plate and is placed between a stator and a centerpiece to limit conduction of vibrations, which are generated in the stator, to the centerpiece.

In Japanese Unexamined Patent Publication No. 2008-301622A, the vibration dampers are designed to be installed to the stator individually. Therefore, when a factory assembly worker is trying to install these vibration dampers simultaneously to the stator, the vibration dampers interfere with each other, thereby hindering the assembling of the vibration dampers to the stator. Thus, it difficult to assemble the vibration dampers simultaneously using an automatic assembling machine. Furthermore, it is conceivable that the factory assembly worker manually installs the vibration dampers one by one with his/her hands. However, in such a case costs are disadvantageously increased. Furthermore, in the case where the vibration dampers, which are designed to be individually installed, are used, the number of the components of the brushless motor is disadvantageously increased. Thus, for the manufacturing of the brushless motor, the time required to stock the vibration dampers at the factory is disadvantageously lengthened, thereby resulting in an increase in the costs.

In the case of Japanese Unexamined Patent Publication No. 2008-259407A described earlier, at the time of assembling the annular vibration damper to the stator, engaging portions (recesses) of the vibration damper need to be forcefully engaged to corresponding engaging portions (protrusions), respectively, of the stator. Therefore, it may not be easy to install the vibration damper to the stator.

SUMMARY OF THE INVENTION

The present invention is made in view of the above disadvantages to address at least one of the above disadvantages.

According to the present invention, there is provided a brushless motor, which includes a rotatable shaft, a rotor, a centerpiece, a stator and a plurality of vibration dampers. The rotor is supported by the rotatable shaft to rotate integrally with the rotatable shaft. The centerpiece includes a tubular support portion, which rotatably supports the rotatable shaft, and a plurality of outer protrusions, which radially outwardly protrude from the tubular support portion and are circumferentially arranged one after another. The stator is located radially outward of the tubular support portion and is configured into an annular form. The stator includes a plurality of primary protrusions, each of which radially inwardly protrudes from an inner peripheral portion of the stator in a radial direction of the stator and is placed at a circumferential center location between corresponding circumferentially adjacent two of the plurality of outer protrusions of the centerpiece in a circumferential direction of the stator. Each of the plurality of vibration dampers is radially placed between the stator and the tubular support portion of the centerpiece in the radial direction of the stator and is circumferentially placed between corresponding two of the plurality of outer protrusions of the centerpiece in the circumferential direction of the stator. Each of the plurality of vibration dampers is made of an elastomer material and includes an outer peripheral portion, first and second circumferential end portions and a primary recess. The outer peripheral portion is arcuately curved in the circumferential direction of the stator and is radially opposed to the inner peripheral portion of the stator in the radial direction of the stator. The first and second circumferential end portions are provided at first and second circumferential ends, respectively, of the outer peripheral portion and are opposed to each other in the circumferential direction of the stator. At least a part of each of the first and second circumferential end portions is engaged with a corresponding one of the plurality of outer protrusions of the centerpiece in the circumferential direction of the stator. The primary recess is radially inwardly recessed from an outer peripheral surface of the outer peripheral portion of the vibration damper and is engaged with a corresponding one of the plurality of primary protrusions of the stator in the circumferential direction of the stator.

According to the present invention, there is also provided a brushless motor, which includes a stator, a vibration damper arrangement and a centerpiece. The stator is configured into an annular form and includes a plurality of primary engaging portions. The vibration damper arrangement is molded from an elastomer material and is installed to the stator at a location radially inward of the stator. The vibration damper arrangement includes a plurality of vibration dampers, which are arranged one after another in a circumferential direction of the stator. Each of the plurality of vibration dampers includes a primary engaging portion, which is engaged with a corresponding one of the plurality of primary engaging portions of the stator, and a secondary engaging portion. The centerpiece includes a tubular portion, which is placed radially inward of the vibration damper arrangement and rotatably supports a rotatable shaft. The tubular portion includes a plurality of secondary engaging portions, each of which is engaged with the secondary engaging portion of a corresponding one of the plurality of vibration dampers. Each of the plurality of vibration dampers of the vibration damper arrangement is separated from each circumferentially adjacent one of the plurality of vibration dampers upon cutting of each of a plurality of connectors, which is initially integrally formed with the plurality of vibration dampers to circumferentially join between corresponding circumferentially adjacent two of the plurality of vibration dampers to form a single closed loop body.

According to the present invention, there is also provided a manufacturing method of a brushless motor. According to the manufacturing method, a vibration damper arrangement, which is integrally molded from an elastomer material and includes a plurality of vibration dampers and a plurality of connectors alternately joined one after another to form a single closed loop body, is installed to a stator, which is configured into an annular form, at a location radially inward of the stator such that a primary engaging portion of each of the plurality of vibration dampers is engaged with a corresponding one of a plurality of primary engaging portions of the stator. The vibration dampers of the vibration damper arrangement are separated from each other by cutting each of the plurality of connectors in a state where the vibration damper arrangement is held by the stator. A centerpiece is installed to the stator and the vibration damper arrangement by inserting a tubular portion of the centerpiece, which is adapted to rotatably support a rotatable shaft, at a location radially inward of the plurality of vibration dampers and by engaging each of a plurality of secondary engaging portions of the tubular portion of the centerpiece to a secondary engaging portion of a corresponding one of the plurality of vibration dampers after the separating of the plurality of vibration dampers.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A brushless motor according to a first embodiment of the present invention will be described with reference to FIGS. 1 to 10.

Figure 1:
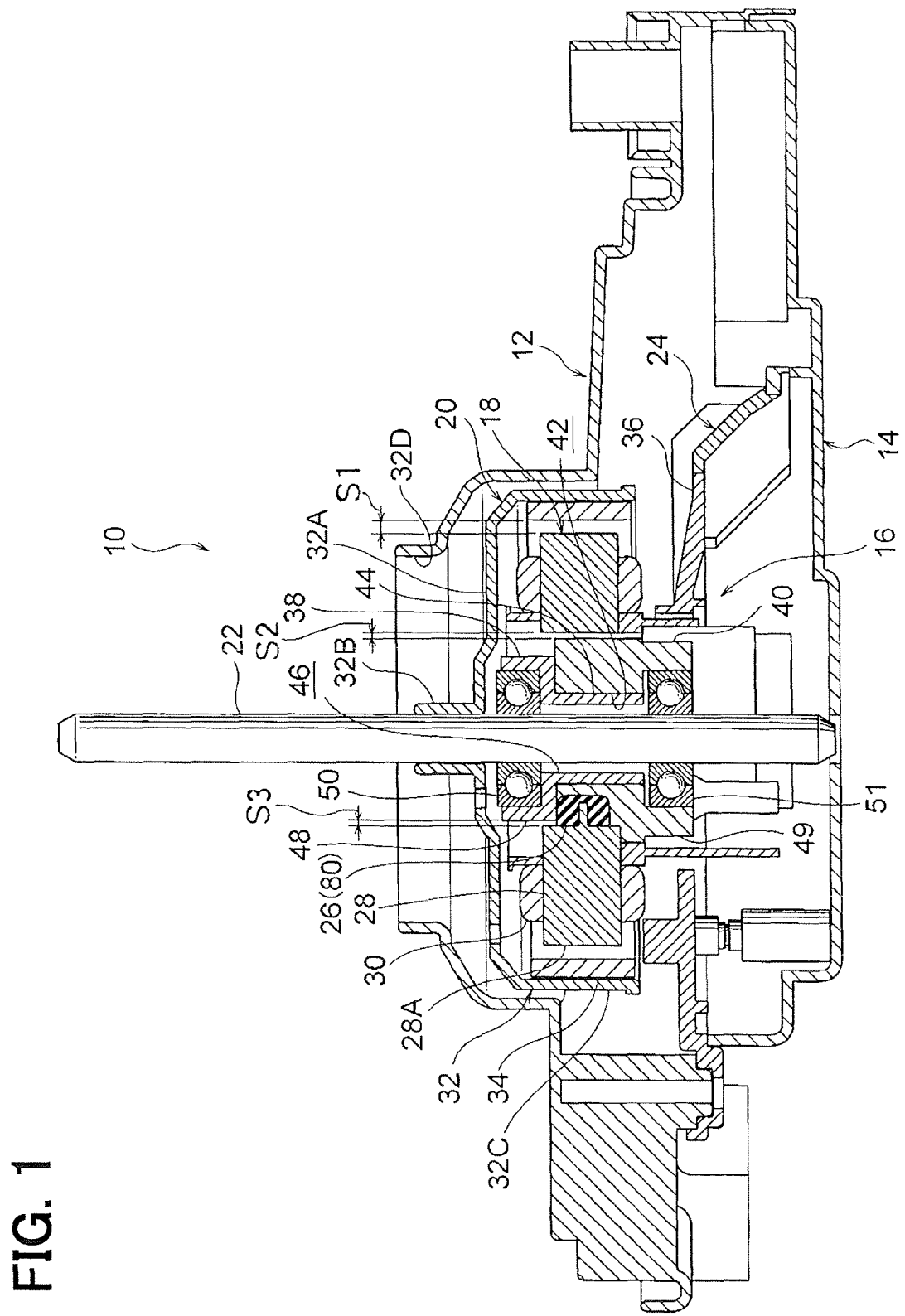
FIG. 1 is a lateral cross-sectional view of a brushless motor according to a first embodiment of the present invention.

The brushless motor 10 shown in FIG. 1 of the present embodiment is suitable for a fan motor, such as a blower motor, which is installed in a vehicle (e.g., an automobile). The brushless motor 10 includes a motor housing 12, an end housing 14 and a motor main body 16 as its main components.

The motor housing 12 and the end housing 14 are assembled together, and the motor main body 16 is received therein. The motor main body 16 includes a stator 18, a rotor 20, a rotatable shaft 22, a centerpiece 24 and a plurality (three in this instance) of vibration dampers 26. The vibration dampers 26 cooperate together to serve as a vibration damper arrangement 100.

The stator 18 includes a stator core 28 and a plurality of stator coils 30. The stator core 28 includes a plurality of teeth 28A, which are arranged one after another in a circumferential direction of the stator core 28 and radially outwardly project. Each of the stator coils 30 is wound around each corresponding one of the teeth 28A. Although not depicted in detail in FIG. 1, the stator core 28 includes a laminated core (iron core) and a dielectric insulator installed to a surface of the laminated core.

The rotor 20 includes a rotor housing 32 and a plurality of rotor magnets (permanent magnets) 34. The rotor housing 32 is configured into a cup-shaped body. A tubular fitting portion 32B is formed in a center part of a base portion 32A of the rotor housing 32. A longitudinal center part of the rotatable shaft 22 is securely fitted to the fitting portion 32B, so that the rotor 20 is rotated integrally with the rotatable shaft 22 upon energization of the stator coils 30.

The rotor magnets 34 are arcuately configured to extend in the circumferential direction about the rotatable shaft 22 and are fixed to an inner peripheral surface of an outer tubular portion 32C of the rotor housing 32, so that the rotor magnets 34 are placed radially outward of the stator core 28 (the teeth 28A) to radially oppose the stator core 28. In this brushless motor 10, when a rotational magnetic field is generated at the stator 18 upon energization of the stator coils 30, the rotor 20 is rotated by actions of a magnetic attractive force and a magnetic repulsive force exerted between the stator 18 and the rotor magnets 34.

The centerpiece 24 includes a centerpiece main body 36 and a cap 38. The centerpiece main body 36 is installed integrally to the end housing 14, and a tubular portion 40 is formed at a center part of the centerpiece main body 36 and extends in an axial direction of the stator 18. A press-fitting hole 42 is formed to axially extend through at a center part of the tubular portion 40. The cap 38 has an insertion portion 44, which is configured into a tubular form. When the insertion portion 44 of the cap 38 is press-fitted into the press-fitting hole 42, the cap 38 is installed integrally to the tubular portion 40. The cap 38 and the tubular portion 40 form a tubular support portion (more specifically, a cylindrical tubular support portion) of the present invention.

A through hole 46 is formed in the insertion portion 44 to axially extend through the insertion portion 44. The rotatable shaft 22 is inserted through the through hole 46. A bearing receiving portion 48 is formed in the cap 38 and receives a bearing 50. A bearing receiving portion 49 is formed in the tubular portion 40 and receives a bearing 51. The rotatable shaft 22 is rotatably supported by the bearings 50, 51. A distal end side of the rotatable shaft 22 projects axially outward through an opening 32D of the motor housing 12, which is formed at a base portion of the motor housing 12. The projected distal end side of the rotatable shaft 22 is connected to an external drive mechanism (not shown).

Each vibration damper 26 elastically supports the stator 18 relative to the centerpiece 24 and is made of an elastomer material (e.g., natural rubber, synthetic rubber or elastic resin). An assembled structure of the vibration dampers 26, the stator core 28 and the tubular portion 40 is as follows.

Figure 2:
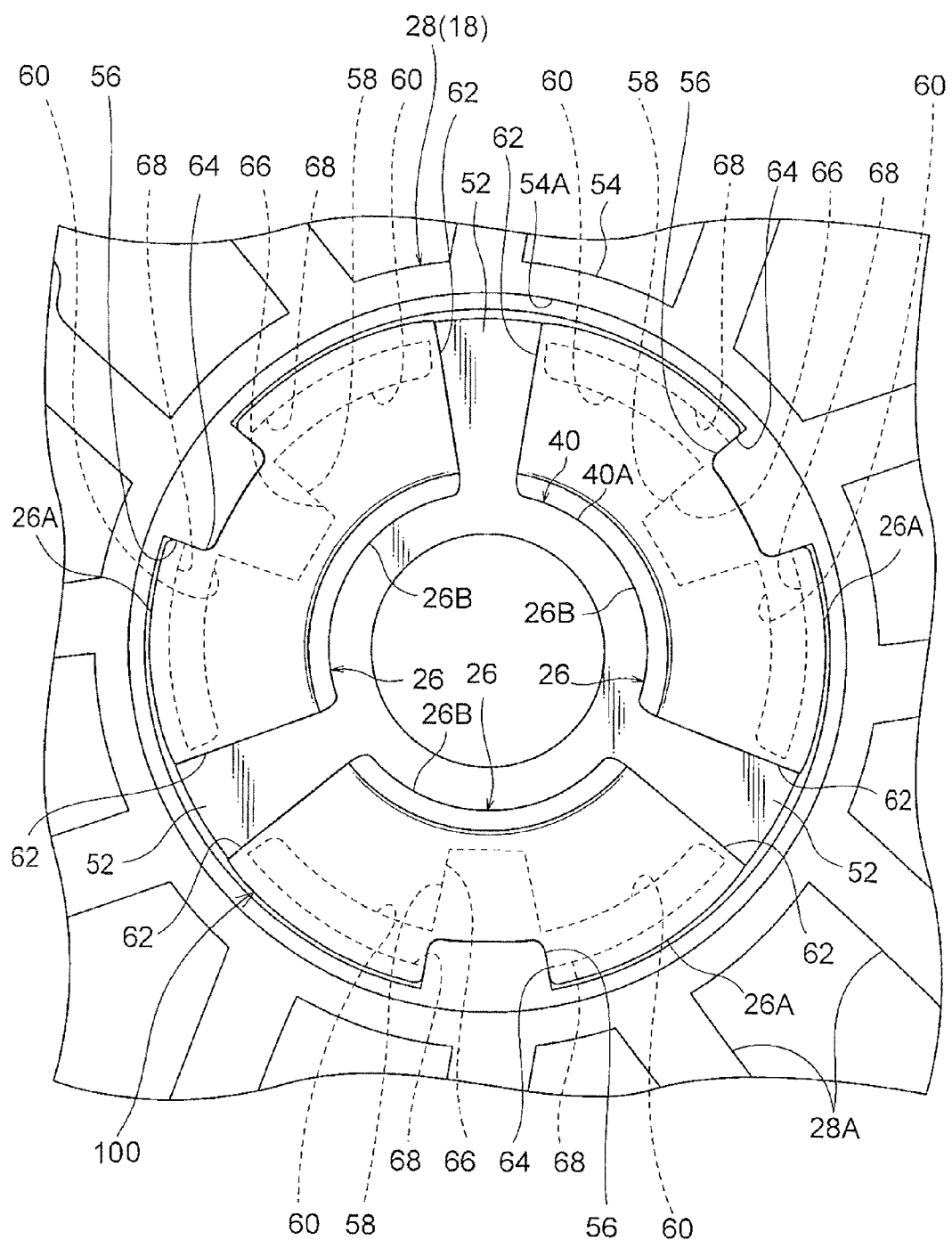
FIG. 2 is a partial enlarged plan view showing a stator core, a plurality of vibration dampers and a centerpiece of the brushless motor shown in FIG. 1.
Figure 3:
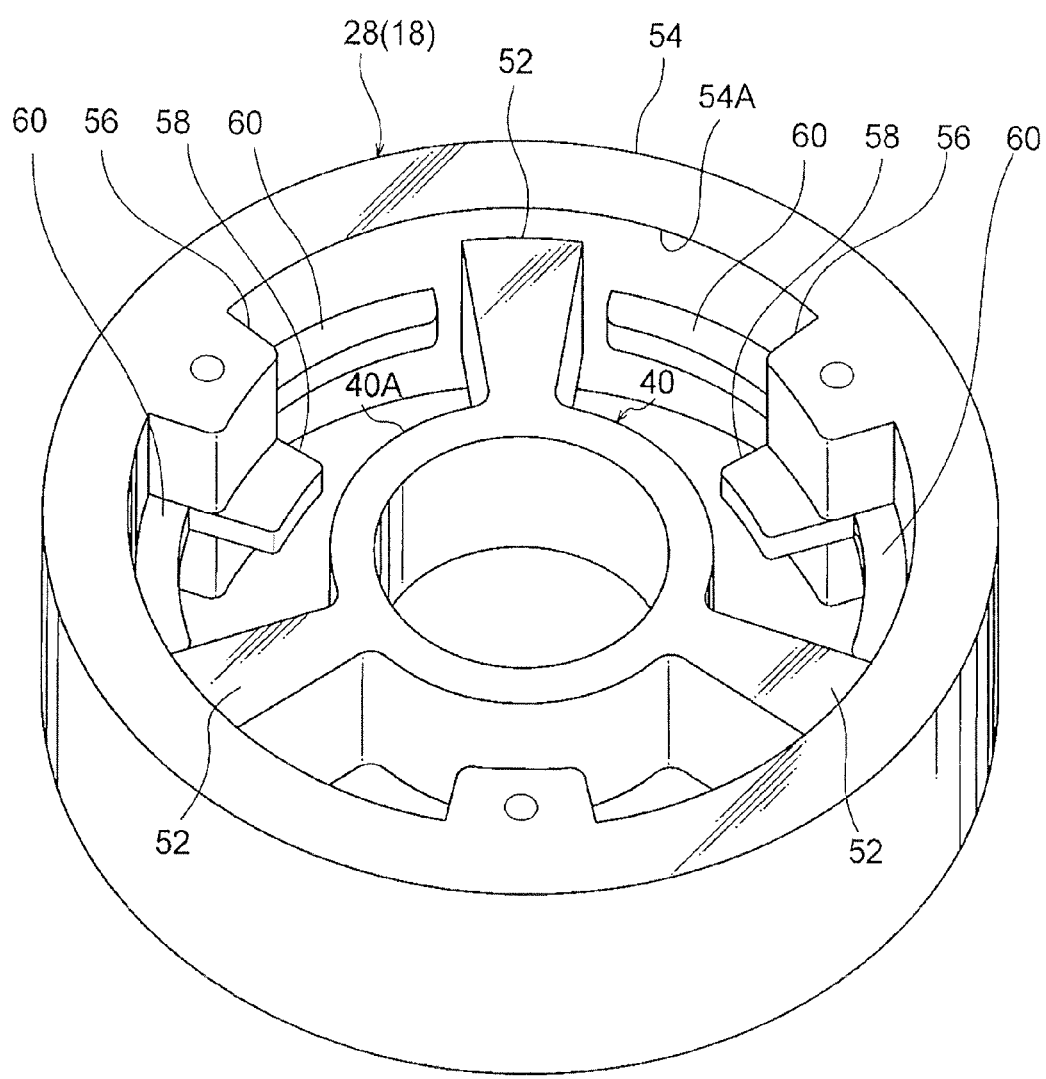
FIG. 3 is a partial schematic enlarged perspective view showing the stator core and the centerpiece of the brushless motor of FIG. 1 without showing the vibration dampers and teeth of the stator core.
Figure 4:
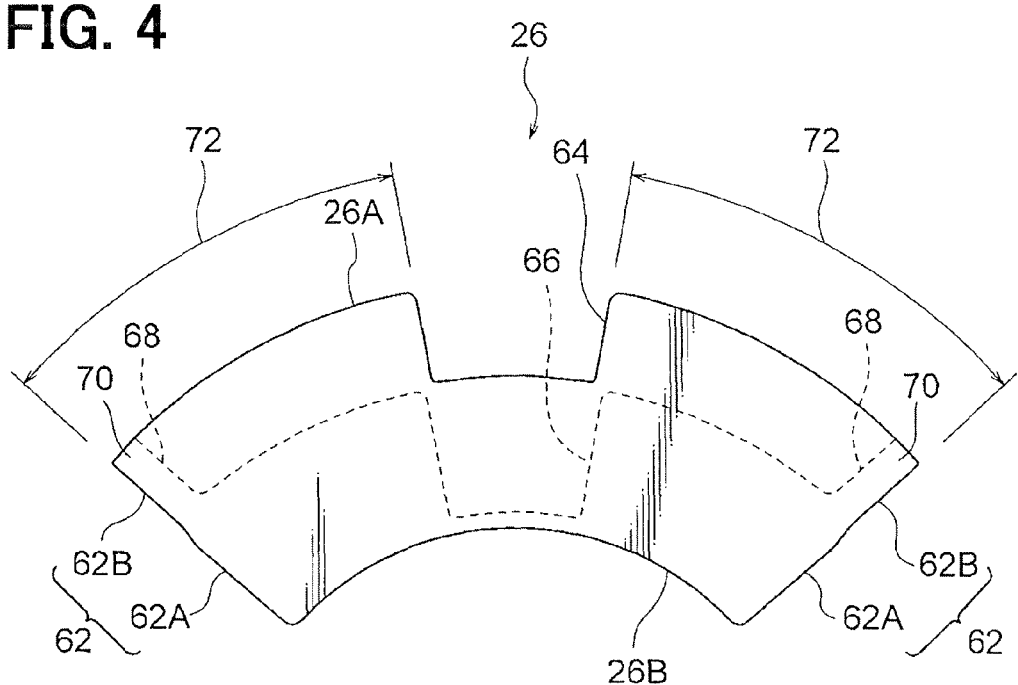
FIG. 4 is a plan view of the vibration damper of the brushless motor of FIG. 1.
Figure 5:
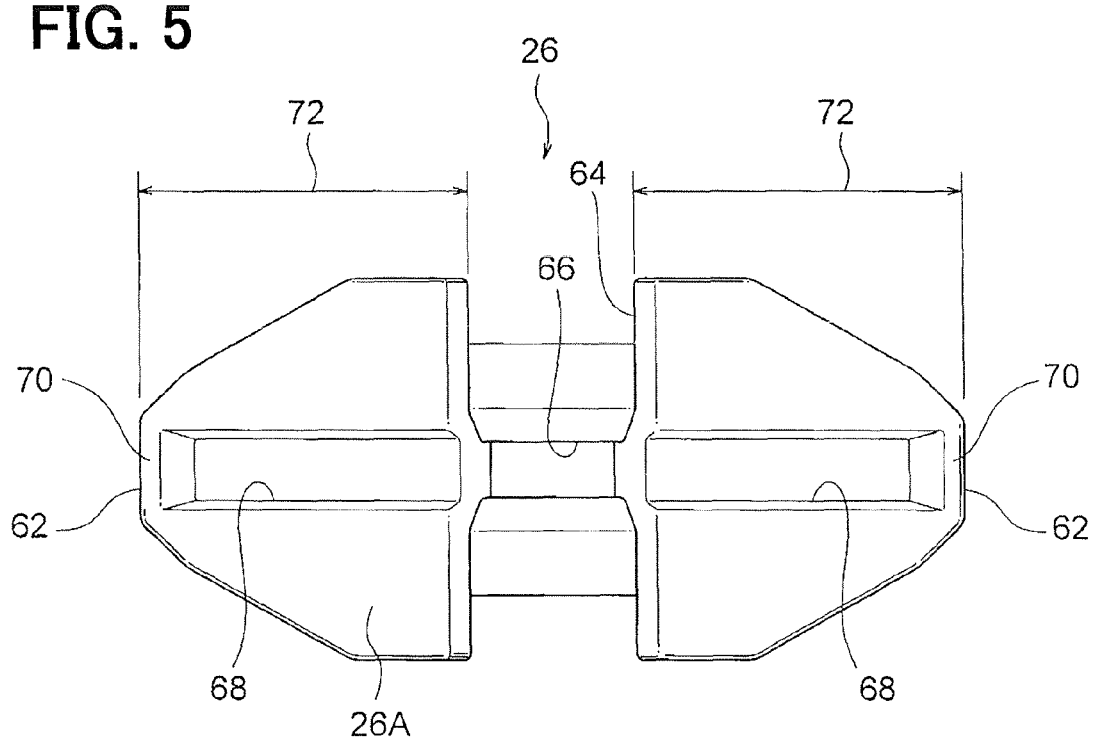
FIG. 5 is a side view of the vibration damper of the brushless motor of FIG. 1.

Specifically, as shown in FIGS. 2 and 3, a plurality (three in this instance) of outer protrusions 52 radially outwardly protrudes from an outer peripheral portion 40A of the tubular portion 40, which has a smooth cylindrical outer peripheral surface. Here, it should be noted that the teeth 28A of the stator core 28 indicated in FIG. 2 are not illustrated in FIG. 3 for sake of simplicity.

A core main body 54 is formed at a center part of the stator core 28. The core main body 54 is configured into an annular form and is located radially outward of the tubular portion 40. A plurality (three in this instance) of primary protrusions 56 is formed at an inner peripheral portion 54A of the core main body 54 and radially inwardly protrudes. The outer protrusions 52 are arranged one after another at generally equal intervals in the circumferential direction of the stator 18. Also, the primary protrusions 56 are arranged one after another at generally equal intervals in the circumferential direction of the stator 18. Each of the primary protrusions 56 is placed at a circumferential center location between corresponding circumferentially adjacent two of the outer protrusions 52.

Furthermore, a projection 58 is formed in each primary protrusion 56 to radially inwardly project in the radial direction of the stator 18. Furthermore, a plurality (six in this instance) of secondary protrusions 60 is formed in the inner peripheral portion 54A of the core main body 54 to radially inwardly protrude. Each secondary protrusion 60 is formed as an arcuate ridge that extends in the circumferential direction at a circumferential location between the corresponding primary protrusion 56 and the corresponding outer protrusion 52, which are placed adjacent to each other in the circumferential direction.

Each of the secondary protrusions 60 and the projections 58 has an axial wall thickness, which is measured in the axial direction of the stator core 28 and is smaller than an axial wall thickness of each of the primary protrusions 56. Furthermore, each of the secondary protrusions 60 and the projections 58 is placed in an axial center part of the core main body 54 in the axial direction of the stator core 28. Each primary protrusion 56, the adjacent projection 58 and the two adjacent secondary protrusions 60 circumferentially located on the left and right sides, respectively, of the primary protrusion 56 may cooperate together to serve as a primary engaging portion of the stator core 28, so that there are provided three primary engaging portions in the stator core 28.

As shown in FIG. 2, each of the vibration dampers 26 is radially placed between the core main body 54 and the tubular portion 40 and is circumferentially placed between the corresponding circumferentially adjacent two of the outer protrusions 52. Each vibration damper 26 has an arcuate outer peripheral portion (outer circumferential portion) 26A at the radially outer side of the vibration damper 26. The outer peripheral portion 26A of the vibration damper 26 is radially opposed to the inner peripheral portion 54A of the core main body 54. The vibration damper 26 also has two circumferential end portions (first and second circumferential end portions) 62, which are circumferentially opposed to each other in the circumferential direction of the stator 18 (see also FIGS. 4 and 5).

Figure 6:
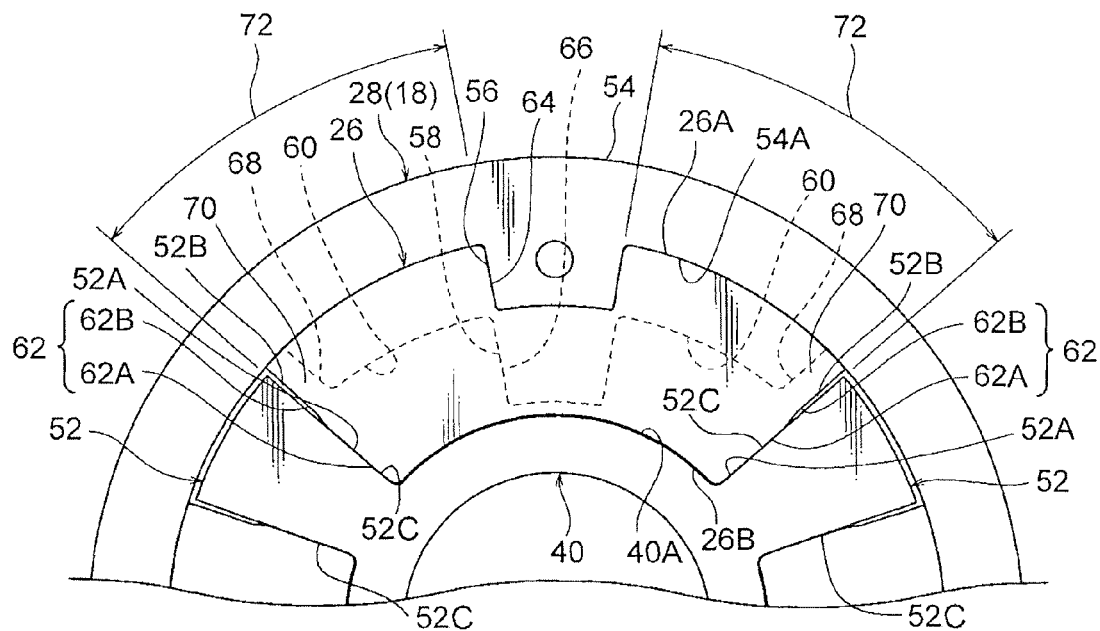
FIG. 6 is a partial enlarged plan view showing the stator core and the centerpiece, to which the vibration dampers are installed, in the brushless motor of FIG. 1.
Figure 7:
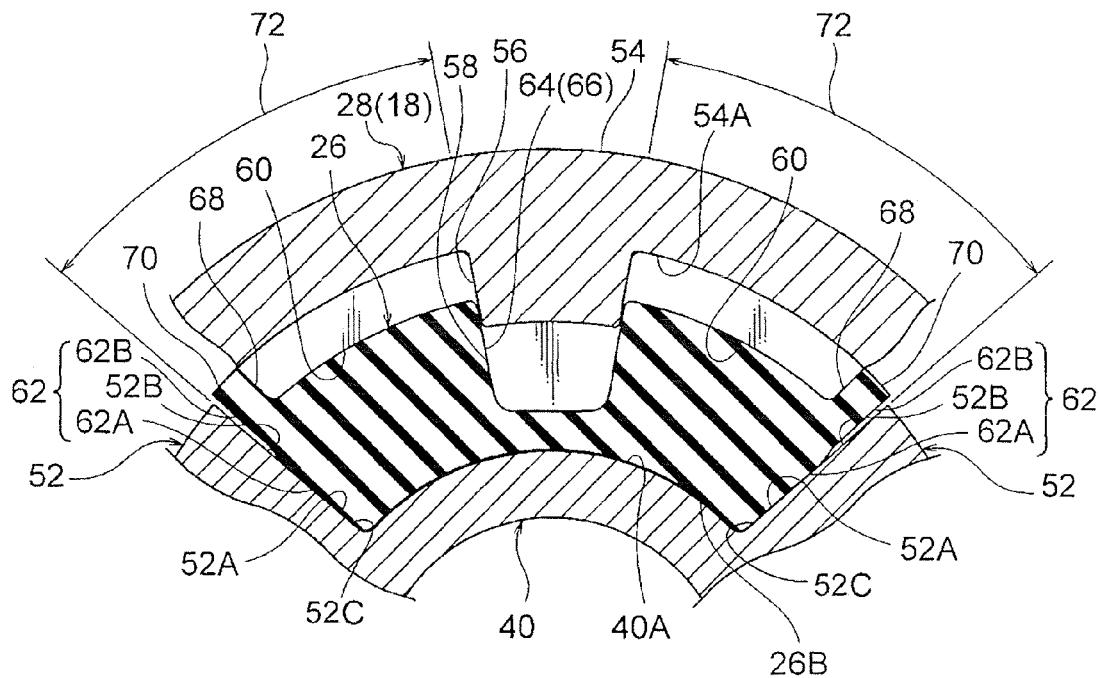
FIG. 7 is an enlarged partial cross-sectional view showing the structure shown in FIG. 6.

Furthermore, as shown in FIGS. 6 and 7, a primary recess 64 is formed in a circumferential center part of the outer peripheral portion 26A of the vibration damper 26, and a groove 66 is radially inwardly recessed from a radially inner bottom of the primary recess 64. Two secondary recesses 68 are formed in the outer peripheral portion 26A of the vibration damper 26 at two opposed circumferential sides, respectively, of the primary recess 64. Each secondary recess 68 is configured as a circumferentially elongated groove (i.e., arcuate groove).

As shown in FIGS. 6 and 7, in the state where the vibration damper 26 is radially placed between the core main body 54 and the tubular portion 40 and is circumferentially placed between the corresponding circumferentially adjacent two of the outer protrusions 52, the primary recess 64 of the vibration damper 26 is circumferentially engaged with the primary protrusion 56 in the circumferential direction of the stator 18. Furthermore, each of the secondary recesses 68 of the vibration damper 26 is engaged with the corresponding secondary protrusion 60 in the axial direction of the stator 18 along the circumferential extent of the secondary protrusion 60. In addition, the groove 66 of the vibration damper 26 is engaged with the corresponding projection 58 in the axial direction of the stator 18. The primary recess 64 and the secondary recesses 68 of the vibration damper 26 cooperate together to serve as a primary engaging portion of the vibration damper 26, which is engaged with a corresponding one of the primary engaging portions of the stator core 28 discussed above. Furthermore, an inner peripheral portion (inner circumferential portion) 26B of the vibration damper 26, which is located at the radially inner side of the vibration damper 26, serves as a secondary engaging portion. The inner peripheral portion 26B, i.e., the secondary engaging portion of the vibration damper 26 is engaged with the corresponding outer peripheral surface section, i.e., a corresponding secondary engaging portion of the outer peripheral portion 40A, which is circumferentially defined between the corresponding circumferentially adjacent two of the outer protrusions 52 of the centerpiece 24.

Figure 8:
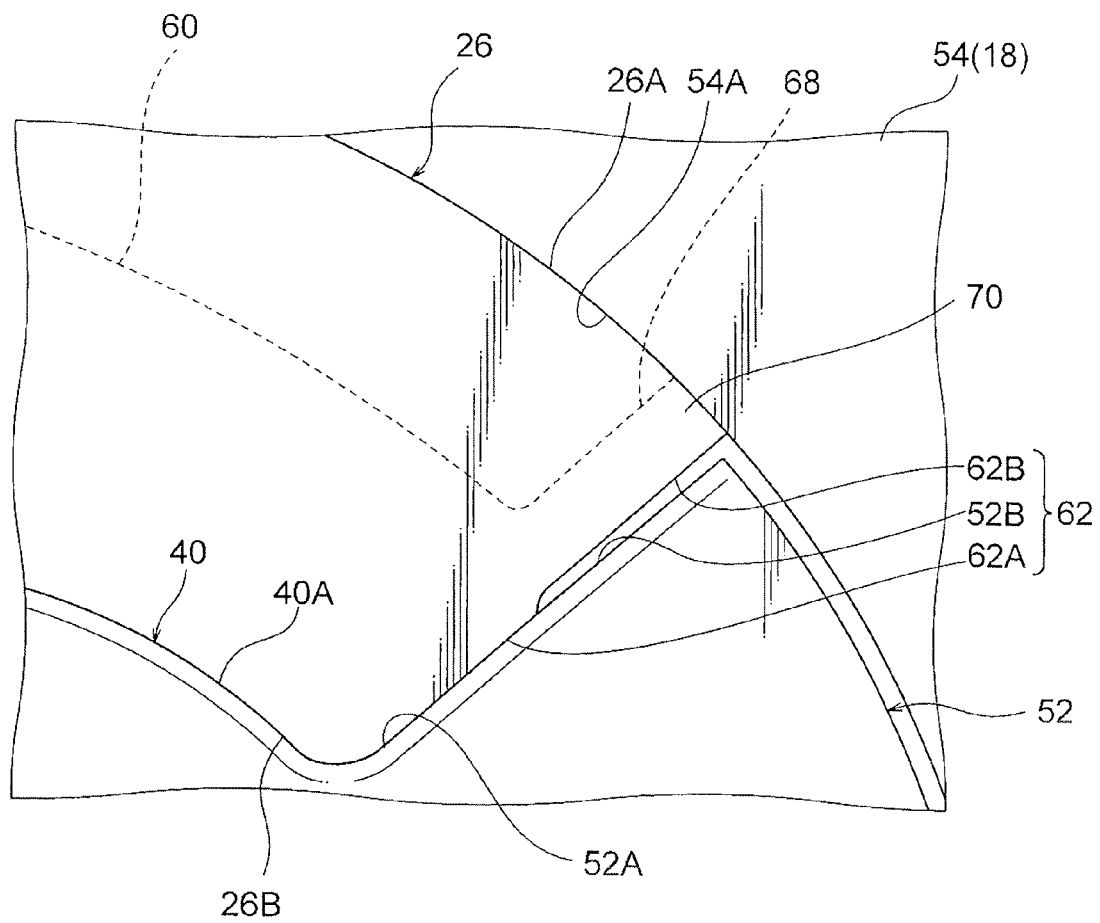
FIG. 8 is a partial further enlarged cross-sectional view showing a portion of the structure of FIG. 6.

Each of the outer protrusions 52 has two side walls (first and second circumferential side walls) 52C, which are circumferentially opposed to each other, and each of these side walls 52C has a main engaging portion 52A and an auxiliary engaging portion 52B arranged one after another in the radial direction in this order from the radially inner side to the radially outer side, as shown in FIGS. 7 and 8. These main and auxiliary engaging portions 52A, 52B are circumferentially opposed to the corresponding adjacent circumferential end portion 62 of the corresponding vibration damper 26. The main engaging portion 52A is placed radially inward of the adjacent secondary protrusion 60 in the radial direction of the stator 18. The auxiliary engaging portion 52B is placed radially outward of the main engaging portion 52A in the radial direction of the stator 18 and is circumferentially opposed to the adjacent secondary protrusion 60 in the circumferential direction of the stator 18.

Furthermore, each of the circumferential end portions 62 of the vibration damper 26 has a main engaging portion 62A and an auxiliary engaging portion 62B. The main engaging portion 62A is formed at a radially inner side part of the circumferential end portion 62 where the inner peripheral portion 26B of the vibration damper 26 is located. The auxiliary engaging portion 62B is formed at a radially outer side part of the circumferential end portion 62 where the outer peripheral portion 26A of the vibration damper 26 is located, so that the auxiliary engaging portion 62B is located radially outward of the main engaging portion 62A in the radial direction of the stator 18. The auxiliary engaging portion 62B is circumferentially inwardly offset from, i.e., is circumferentially recessed from the main engaging portion 62A in the circumferential direction of the outer peripheral portion 26A toward the circumferential center part of the outer peripheral portion 26A. Furthermore, the auxiliary engaging portion 62B is generally parallel to the radially adjacent main engaging portion 62A in the radial direction of the stator 18 and is also generally parallel to the circumferentially adjacent auxiliary engaging portion 52B of the outer protrusion 52, as shown in FIG. 8.

In the state where each vibration damper 26 is radially placed between the core main body 54 and the tubular portion 40 and is circumferentially placed between the corresponding two of the outer protrusions 52, the main engaging portion 62A of each circumferential end portion 62 of the vibration damper 26 is circumferentially engaged with the circumferentially adjacent main engaging portion 52A of the corresponding outer protrusion 52 in the circumferential direction of the stator 18, and the auxiliary engaging portion 62B of the circumferential end portion 62 of the vibration damper 26 is circumferentially spaced from the circumferentially adjacent auxiliary engaging portion 52B of the corresponding outer protrusion 52 in the circumferential direction of the stator 18.

An elastic modulus of each vibration damper 26 and a circumferential gap between the auxiliary engaging portion 62B of the circumferential end portion 62 of the vibration damper 26 and the adjacent auxiliary engaging portion 52B of the outer protrusion 52 are appropriately set such that the auxiliary engaging portion 62B is circumferentially engaged with the circumferentially adjacent auxiliary engaging portion 52B of the corresponding outer protrusion 52 when the vibration damper 26 is resiliently deformed upon application of a load, which is applied from the stator 18 to the vibration damper 26 and is equal to or larger than a predetermined value. The predetermined value should be appropriately set at the time of designing the brushless motor 10.

Figure 9:
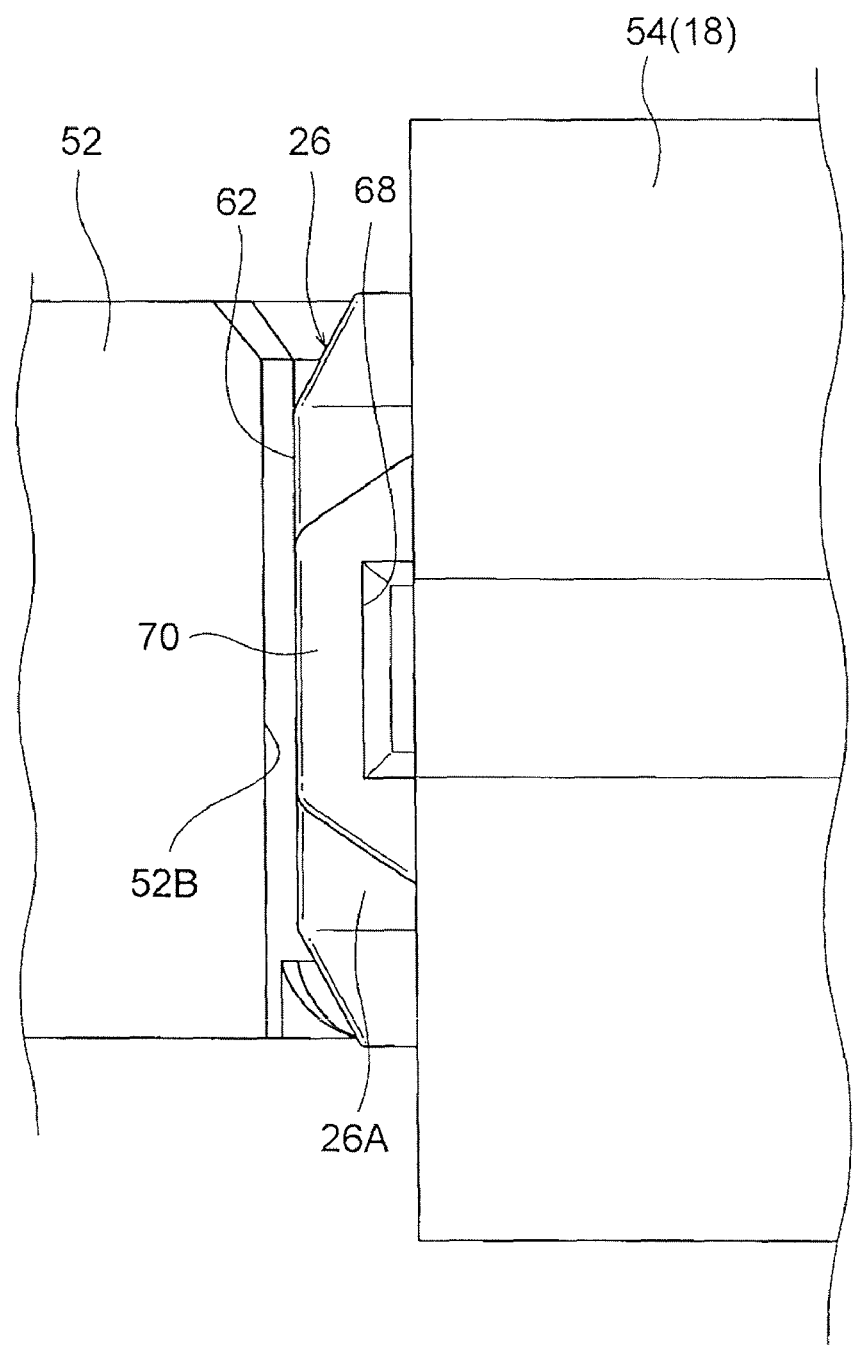
FIG. 9 is a partial enlarged view showing an assembled state of the stator core, the centerpiece and the vibration dampers shown in FIG. 8.

As shown in FIGS. 7 and 8, each vibration damper 26 includes two stopper portions (first and second stopper portions) 70, each of which is formed in a corresponding one of the circumferential end portions 62 of the vibration damper 26 at a circumferential location between the auxiliary engaging portion 52B of the corresponding outer protrusion 52 and the adjacent secondary protrusion 60 in the circumferential direction of the stator 18 (also see FIG. 9).

Figure 10:
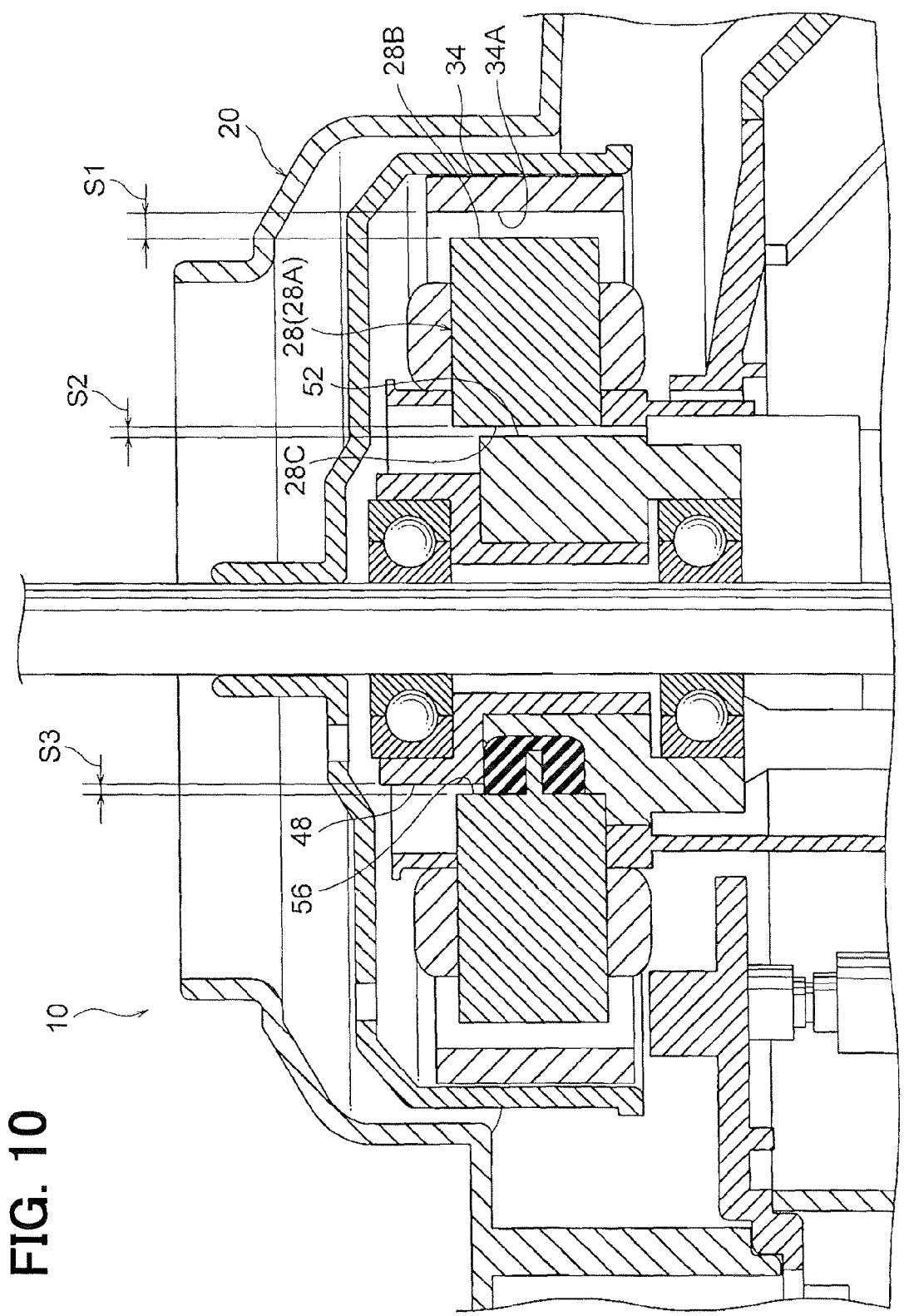
FIG. 10 is a partial enlarged view of the brushless motor shown in FIG. 1.

In the brushless motor 10, as shown in FIG. 10, a radial gap S1 between an inner peripheral portion 34A of the corresponding rotor magnet 34 and an outer peripheral portion 28B of the stator core 28 (the corresponding one of the teeth 28A), a radial gap S2 between the corresponding outer protrusion 52 and an inner peripheral portion 28C of the stator core 28, and a radial gap S3 between the bearing receiving portion 48 and the corresponding primary protrusion 56 are set to satisfy a relationship of S1>S2 or a relationship of S1>S3.

Next, advantages of the present embodiment will be described.

In the brushless motor 10 of the present embodiment, as shown in FIG. 2, the multiple vibration dampers 26 are radially placed between the stator 18 and the centerpiece 24. The primary recess 64 of each vibration damper 26 is circumferentially engaged with the corresponding primary protrusion 56 of the stator 18 in the circumferential direction of the stator 18, and each circumferential end portion 62 of the vibration damper 26 is circumferentially engaged with the corresponding outer protrusion 52 of the centerpiece 24 in the circumferential direction of the stator 18. Therefore, even when the vibrations are generated in the stator 18, the vibrations can be absorbed, i.e., can be damped by the vibration dampers 26. Thereby, it is possible to limit or minimize conduction of the vibrations, which are generated in the stator 18, to the centerpiece 24.

Here, each primary protrusion 56 is formed at the circumferential center location between the corresponding circumferentially adjacent two of the outer protrusions 52, and the corresponding primary recess 64, which is engaged with this primary protrusion 56, is formed at the circumferential center part of the outer peripheral portion 26A of the vibration damper 26. Thereby, as shown in FIGS. 4 to 7, it is possible to increase a volume of each of shock absorbing portions (damping portions) 72 of the vibration damper 26, each of which is formed between the primary recess 64 and the corresponding one of the circumferential end portions 62 in comparison to the volume of the prior art shock absorbing portion. Therefore, the vibration damping performance of the vibration damper 26 can be improved.

Furthermore, in a state (low load state) of the brushless motor 10 where the load, which is applied from the stator 18 to the vibration damper 26, is less than the predetermined value, the auxiliary engaging portion 52B of the outer protrusion 52 and the auxiliary engaging portion 62B of the corresponding vibration damper 26 are circumferentially spaced from each other in the circumferential direction of the stator 18 by a circumferential gap therebetween, and the main engaging portion 52A of the outer protrusion 52 and the main engaging portion 62A of the corresponding vibration damper 26 are circumferentially engaged with each other. Thus, in this state, a spring constant of each vibration damper 26 becomes low, so that vibrations of a low frequency can be effectively absorbed, i.e., can be effectively damped by the vibration dampers 26.

In contrast, in a state (high load state) of the brushless motor 10 where the load, which is applied from the stator 18 to the vibration damper 26, is equal to or higher than the predetermined value, the auxiliary engaging portion 52B of the outer protrusion 52 and the auxiliary engaging portion 62B of the corresponding vibration damper 26 are circumferentially engaged with each other in the circumferential direction of the stator 18 while the main engaging portion 52A of the outer protrusion 52 and the main engaging portion 62A of the corresponding vibration damper 26 are circumferentially engaged with each other. Thus, in this state, the spring constant of each vibration damper 26 becomes high, so that vibrations of a high frequency can be effectively absorbed, i.e., can be effectively damped by the vibration dampers 26.

As discussed above, the spring constant of the vibration damper 26 is variable, i.e., is changed depending on the load (circumferential load) applied from the stator 18 to the vibration damper 26, thereby the vibration can be effectively absorbed, i.e., damped throughout a wider rotational speed range of the brushless motor.

Furthermore, in this brushless motor 10, each secondary protrusion 60 of the stator 18 extends in the circumferential direction of the stator 18, and the corresponding secondary recess 68 of the vibration damper 26 is axially engaged with the secondary protrusion 60 in the axial direction of the stator 18 along the circumferential extent of the secondary protrusion 60. Therefore, an engaging surface (contact surface, i.e., support surface) between the stator 18 and the vibration damper 26 is increased, so that a positional accuracy and a holding strength of the stator 18 relative to the centerpiece 24 can be improved. In this way, the appropriate weight balance of the stator 18 relative to the centerpiece 24 can be maintained.

Particularly, the projection 58 is formed in the primary protrusion 56, and the groove 66 is formed in the primary recess 64, and the projection 58 and the groove 66 are engaged with each other in the axial direction of the stator 18. Therefore, the total engaging surface (contact surface, i.e., support surface) between the stator 18 and the vibration damper 26 is further increased. Thus, the positional accuracy and the holding strength of the stator 18 relative to the centerpiece 24 are further improved.

In addition, in the brushless motor 10, each stopper portion 70 is interposed between the corresponding auxiliary engaging portion 52B and the corresponding secondary protrusion 60 in the circumferential direction of the stator 18. Therefore, it is possible to further limit generation of noisy sound, which would be otherwise induced by interference between the auxiliary engaging portion 52B (outer protrusion 52) and the secondary protrusion 60 in the absence of the stopper portion 70.

Furthermore, as discussed above, in the state where the load, which is applied from the stator 18 to the vibration damper 26, is equal to or larger than the predetermined value, and thereby the auxiliary engaging portion 52B and the auxiliary engaging portion 62B are engaged with each other, the stopper portion 70, which is interposed between the auxiliary engaging portion 52B and the secondary protrusion 60, can also absorb, i.e., damp the vibrations. Thus, the vibration damping performance in the high load state can be further improved.

Furthermore, as shown in FIG. 10, in the brushless motor 10 of the present embodiment, even when the inner peripheral portion 34A of the rotor magnet 34 and the outer peripheral portion 28B of the stator core 28 are forced to contact with each other due to, for example, vibrations during the rotation of the rotor 20, the outer protrusion 52 and the inner peripheral portion 28C of the stator core 28 or the bearing receiving portion 48 and the primary protrusion 56 contact with each other before occurrence of the contact between the inner peripheral portion 34A of the rotor magnet 34 and the outer peripheral portion 28B of the stator core 28. Thus, the outer protrusion 52, the inner peripheral portion 28C, the bearing receiving portion 48 and the primary protrusion 56 serve as stopper portions (radial stopper portions), so that it is possible to limit the contact between the inner peripheral portion 34A of the rotor magnet 34 and the outer peripheral portion 28B of the stator core 28.

Furthermore, in such a case, when the radial gaps S1, S2, S3 satisfy the relationship of S1>S2 and the relationship of S1>S3, it is possible to obtain the contact state between the outer protrusion 52 and the inner peripheral portion 28C of the stator core 28 and/or the contact state between the bearing receiving portion 48 and the primary protrusion 56 before the occurrence of the contact between the inner peripheral portion 34A of the rotor magnet 34 and the outer peripheral portion 28B of the stator core 28. In this way, it is possible to further effectively limit the contact between the inner peripheral portion 34A of the rotor magnet 34 and the outer peripheral portion 28B of the stator core 28.

Particularly, when the radial gaps S2, S3 satisfy a relationship of S2=S3, the contact state between the outer protrusion 52 and the inner peripheral portion 28C of the stator core 28 and the contact state between the bearing receiving portion 48 and the primary protrusion 56 can be simultaneously obtained before the occurrence of the contact between the inner peripheral portion 34A of the rotor magnet 34 and the outer peripheral portion 28B of the stator core 28. In this way, it is possible to further effectively limit the contact between the inner peripheral portion 34A of the rotor magnet 34 and the outer peripheral portion 28B of the stator core 28.

Next, modifications of the first embodiment will be described.

In the first embodiment, the main engaging portion 62A and the auxiliary engaging portion 62B of each circumferential end portion 62 are formed such that a step is formed between the main engaging portion 62A and the auxiliary engaging portion 62B. Alternatively, the main engaging portion 62A and the auxiliary engaging portion 62B of each circumferential end portion 62 may be formed continuously as a continuous planar surface, which is tilted relative to the radial direction of the stator 18 such that a circumferential distance between the continuous planar surface of the circumferential end portion 62 and the adjacent side wall 52C of the corresponding outer protrusion 52 is progressively increased toward the radially outer side of the stator 18 to provide the auxiliary engaging portion 62B in the continuous planar surface of the circumferential end portion 62.

In the above embodiment, the main engaging portion 52A and the auxiliary engaging portion 52B of each outer protrusion 52 are formed as the continuous planar surface, and the corresponding main engaging portion 62A and the corresponding auxiliary engaging portion 62B are formed to have the step therebetween to circumferentially space between the auxiliary engaging portion 62B and the auxiliary engaging portion 52B in the normal state where the load, which is applied from the stator 18 to the vibration damper 26, is less than the predetermined value. However, this structure may be modified as follows.

Figure 11:
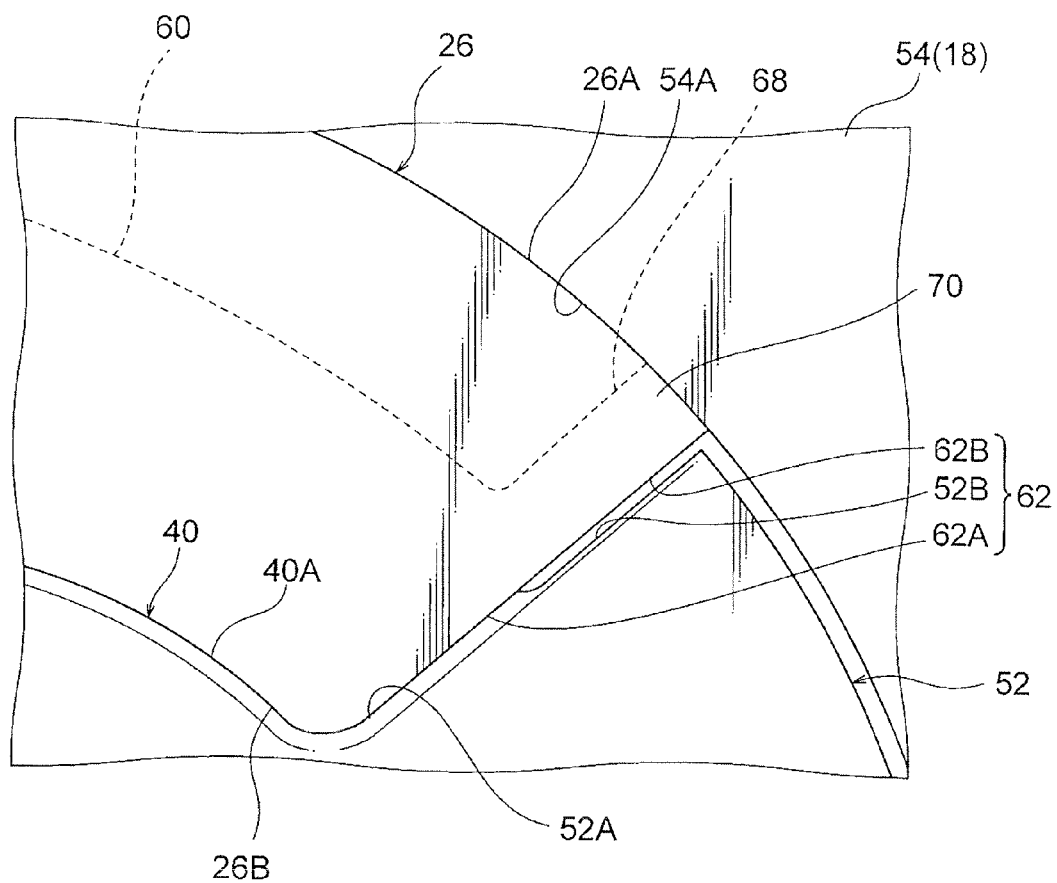
FIG. 11 is a partial enlarged cross-sectional view showing a modification of the structure of FIG. 8.

Specifically, the above structure may be modified in a manner shown in FIG. 11. Specifically, in the case of FIG. 11, the main engaging portion 62A and the auxiliary engaging portion 62B are formed as the continuous planar surface, and the main engaging portion 52A and the auxiliary engaging portion 52B are formed to have a step therebetween, so that the auxiliary engaging portion 52B is spaced from the auxiliary engaging portion 62B in the normal state.

Furthermore, although not illustrated, the step may be formed between the main engaging portion 52A and the auxiliary engaging portion 52B, and the step may be formed between the main engaging portion 62A and the auxiliary engaging portion 62B. In such a case, these steps should be set such that the auxiliary engaging portion 52B and the auxiliary engaging portion 62B are circumferentially spaced from each other in the normal state. That is, as long as the circumferential gap is provided between the auxiliary engaging portion 52B and the auxiliary engaging portion 62B in the normal state where the load, which is applied from the stator 18 to the vibration damper 26, is less than the predetermined value, the configurations of the main engaging portion 52A and the auxiliary engaging portion 52B of the outer protrusion 52 and the main engaging portion 62A and the auxiliary engaging portion 62B of the vibration damper 26 may be changed in any desirable manner.

In addition, in a case where the spring constant of the vibration damper 26 needs not be changed, each circumferential end portion 62 may be circumferentially engaged with the corresponding outer protrusion 52 in the circumferential direction of the stator 18 along substantially the entire radial extent of the circumferential end portion 62.

Second Embodiment

Now, a brushless motor according to a second embodiment of the present invention will be described with reference to FIGS. 12 to 23 in view of FIG. 1. In the second embodiment, some components, which are similar to those discussed in the first embodiment, will be indicated by the same reference numerals and will not be described redundantly for the sake of simplicity.

The structure of the brushless motor 10 of the second embodiment is similar to the structure of the brushless motor 10 of the first embodiment except the structure of respective vibration dampers 80. Therefore, the structure of the brushless motor shown in FIG. 1 is also equally implemented in the second embodiment, and thereby the following discussion should be read in view of FIG. 1. The vibration dampers 80 of the second embodiment, which are molded as and handled as a vibration damper arrangement 100 described below in detail, are made of an elastomer material (e.g., natural rubber, synthetic rubber or elastic resin) and are radially placed between the stator core 28 and the tubular portion 40. The assembled structure of the vibration dampers 80, the stator core 28 and the tubular portion 40 will be described below.

Figure 12:
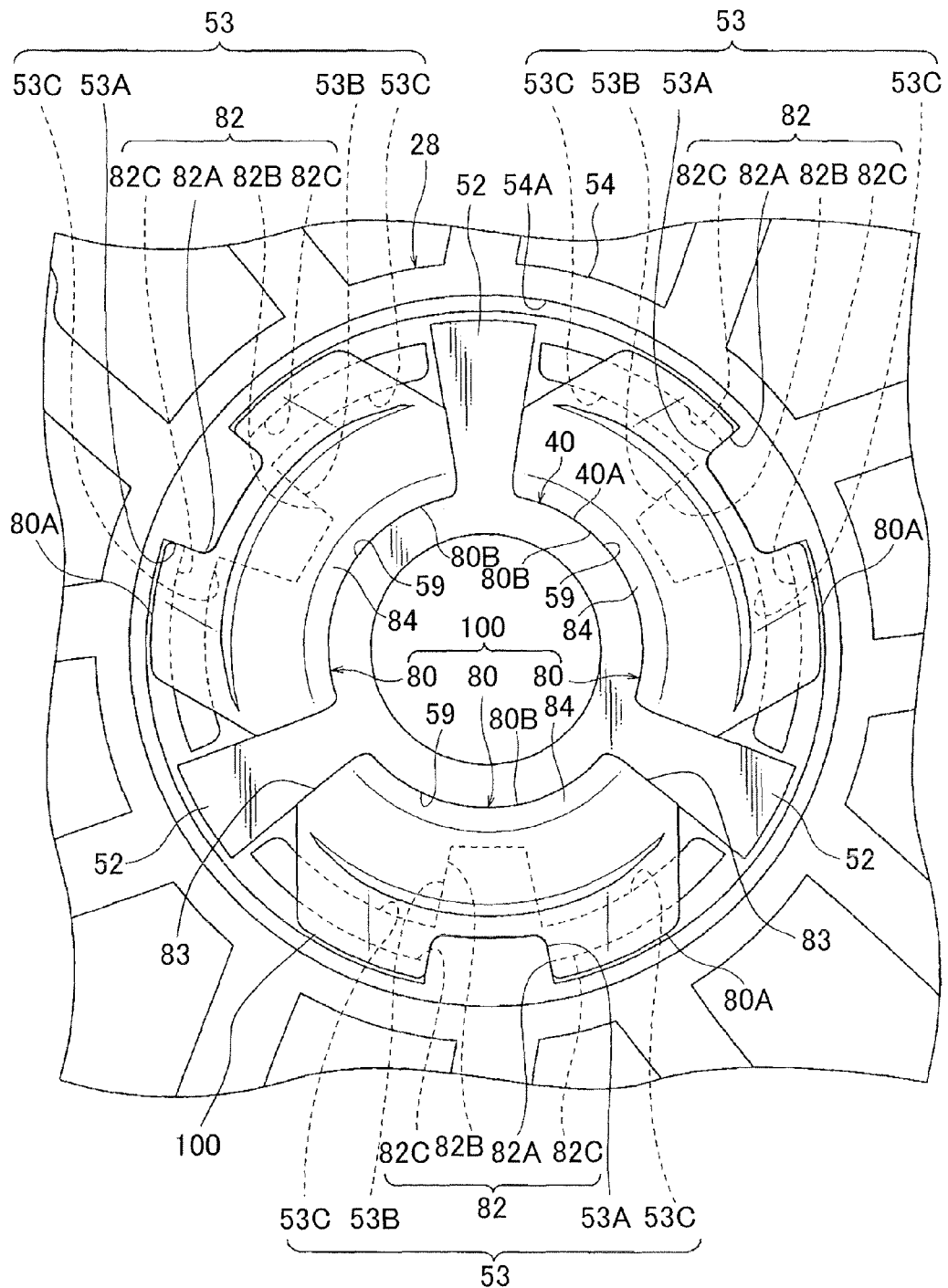
FIG. 12 is a partial enlarged plan view showing a stator core, a plurality of vibration dampers and a centerpiece of a brushless motor according to a second embodiment of the present invention.
Figure 13:
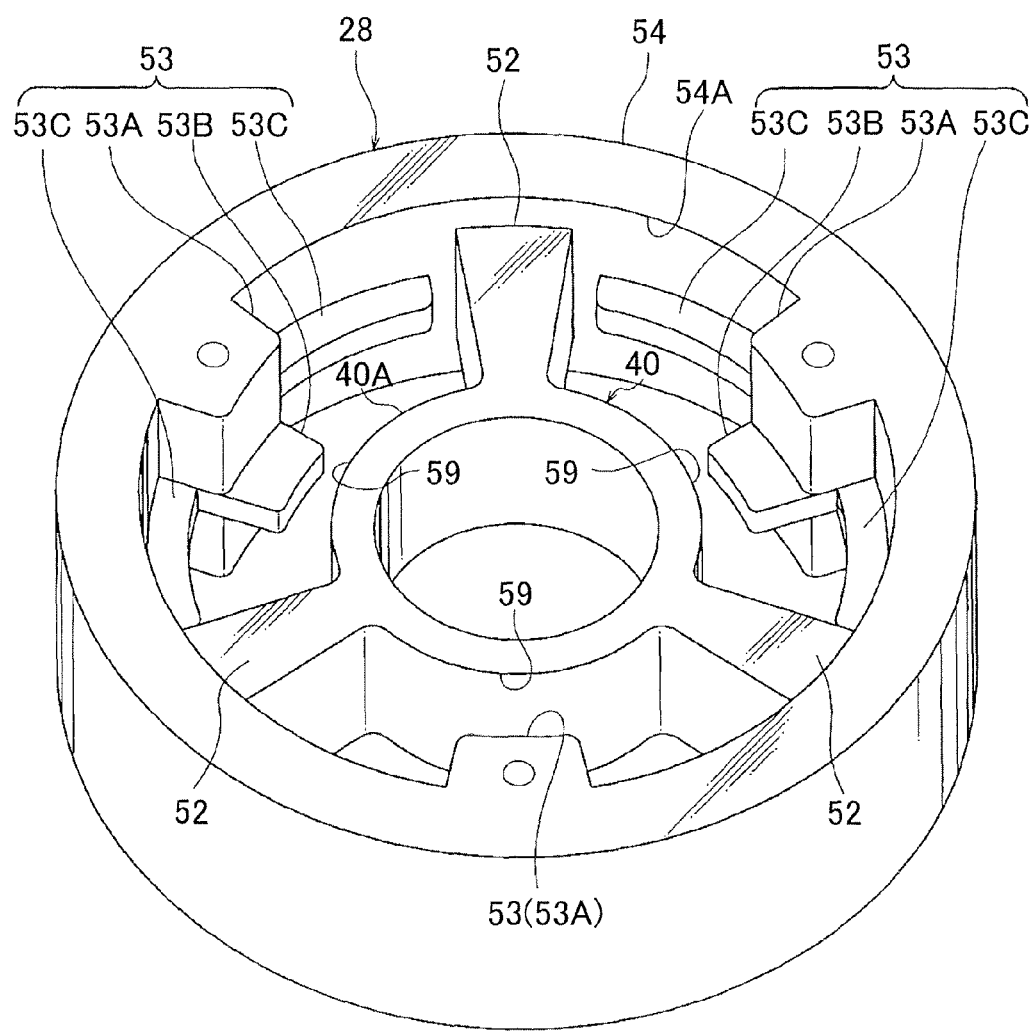
FIG. 13 is a partial schematic enlarged perspective view showing the stator core and the centerpiece of the brushless motor of the second embodiment without showing the vibration dampers and teeth of the stator core.

Specifically, as shown in FIGS. 12 and 13, similar to the first embodiment, the core main body 54 is formed at the center part of the stator core 28. The core main body 54 is configured into the annular form. A plurality of primary engaging portions 53 is formed along the inner peripheral portion 54A of the core main body 54 such that the primary engaging portions 53 are arranged one after another in the circumferential direction of the stator core 28. Each primary engaging portion 53 includes a primary protrusion 53A, a projection 53B and two secondary protrusions 53C.

A circumferential width of the primary protrusion 53A is smaller than a circumferential width of an outer peripheral portion 80A of the vibration damper 80. The primary protrusion 53A radially inwardly protrudes from the inner peripheral portion 54A of the core main body 54 in the radial direction of the stator core 28. An axial thickness of the projection 53B, which is measured in the axial direction of the stator core 28, is smaller than that of the primary protrusion 53A. The projection 53B radially inwardly projects from an axial center part of the primary protrusion 53A in the radial direction of the stator core 28.

The two secondary protrusions 53C are placed on two opposed circumferential sides, respectively, of the primary protrusion 53A and circumferentially arcuately extend. Similar to the projection 53B, an axial wall thickness of each secondary protrusion 53C, which is measured in the axial direction of the stator core 28, is smaller than that of the primary protrusion 53A.

An outer diameter of the tubular portion 40 is smaller than that of the core main body 54 and is placed radially inward of the core main body 54. A plurality of outer protrusions 52 radially outwardly protrudes from the outer peripheral portion 40A of the tubular portion 40 such that the outer protrusions 52 are arranged one after another in the circumferential direction. A plurality of secondary engaging portions 59 is formed such that each secondary engaging portion 59 is formed along the outer peripheral portion 40A of the tubular portion 40 at a corresponding location, which is circumferentially located between corresponding circumferentially adjacent two of the outer protrusions 52. Furthermore, each secondary engaging portion 59 is radially inwardly recessed relative to the adjacent outer protrusions 52. An outer peripheral surface of each secondary engaging portion 59 is smooth along a generally entire extent thereof.

The vibration dampers 80 are arranged one after another in the circumferential direction of the stator core 28. Each vibration damper 80 includes a primary engaging portion 82 at the outer peripheral portion 80A of the vibration damper 80 and a secondary engaging portion 84 at an inner peripheral portion 80B of the vibration damper 80.

In the present embodiment, each of the number of the vibration dampers 80, the number of the primary engaging portions 82, the number of the secondary engaging portions 84, the number of the primary engaging portions 53 and the number of the secondary engaging portions 59 is set to be three although the number can be modified in an appropriate number depending on a need.

The primary engaging portion 82 of each vibration damper 80 includes a primary recess 82A, a groove 82B and two secondary recesses 82C. The primary recess 82A is engaged with the primary protrusion 53A of the corresponding primary engaging portion 53. The groove 82B is engaged with the projection 53B of the corresponding primary engaging portion 53. The secondary recesses 82C are engaged with the secondary protrusions 53C, respectively, of the corresponding primary engaging portion 53. The primary recess 82A is radially inwardly recessed to have its opening directed radially outward in the radial direction of the stator core 28 and extends in the axial direction of the stator core 28 to have its opening on both axial sides of the vibration damper 80 in the axial direction of the stator core 28.

The groove 82B is formed at a radially inner bottom of the primary recess 82A and is radially inwardly recessed therefrom to have its opening directed radially outward in the radial direction of the stator core 28. The two secondary recesses 82C are formed on two circumferential sides of the primary recess 82A in the circumferential direction of the stator core 28 and are arcuately extended in the circumferential direction of the stator core 28.

The secondary engaging portion 84 of the vibration damper 80 is formed at the inner peripheral portion 80B of the vibration damper 80 to radially inwardly protrude in the radial direction of the stator core 28 and is engaged with the corresponding secondary engaging portion 59 of the tubular portion 40. Furthermore, two circumferential end portions (first and second circumferential end portions) 83 of the vibration damper 80 are engaged to the circumferentially adjacent two of the outer protrusions 52 at a radially inner portion (serving as a main engaging portion) of the circumferential end portion 83 in a manner similar to that of the main engaging portions 62A of the circumferential end portions 62 of the first embodiment, and a radially outer portion of each of the circumferential end portions 83 is not engaged with the corresponding adjacent outer protrusion 52 (see FIG. 12).

As shown in FIG. 12, the molded vibration damper arrangement 100 is divided into the multiple (three) vibration dampers 80 upon assembling of the stator core 28 and the centerpiece 24 together. However, at the time before the assembling of the stator core 28 and the centerpiece 24, i.e., at the time of molding (manufacturing) of the vibration damper arrangement 100 from the elastomer material (e.g., natural rubber, synthetic rubber or elastic resin), the vibration damper arrangement 100 is molded to have the following structure.

Figure 14:
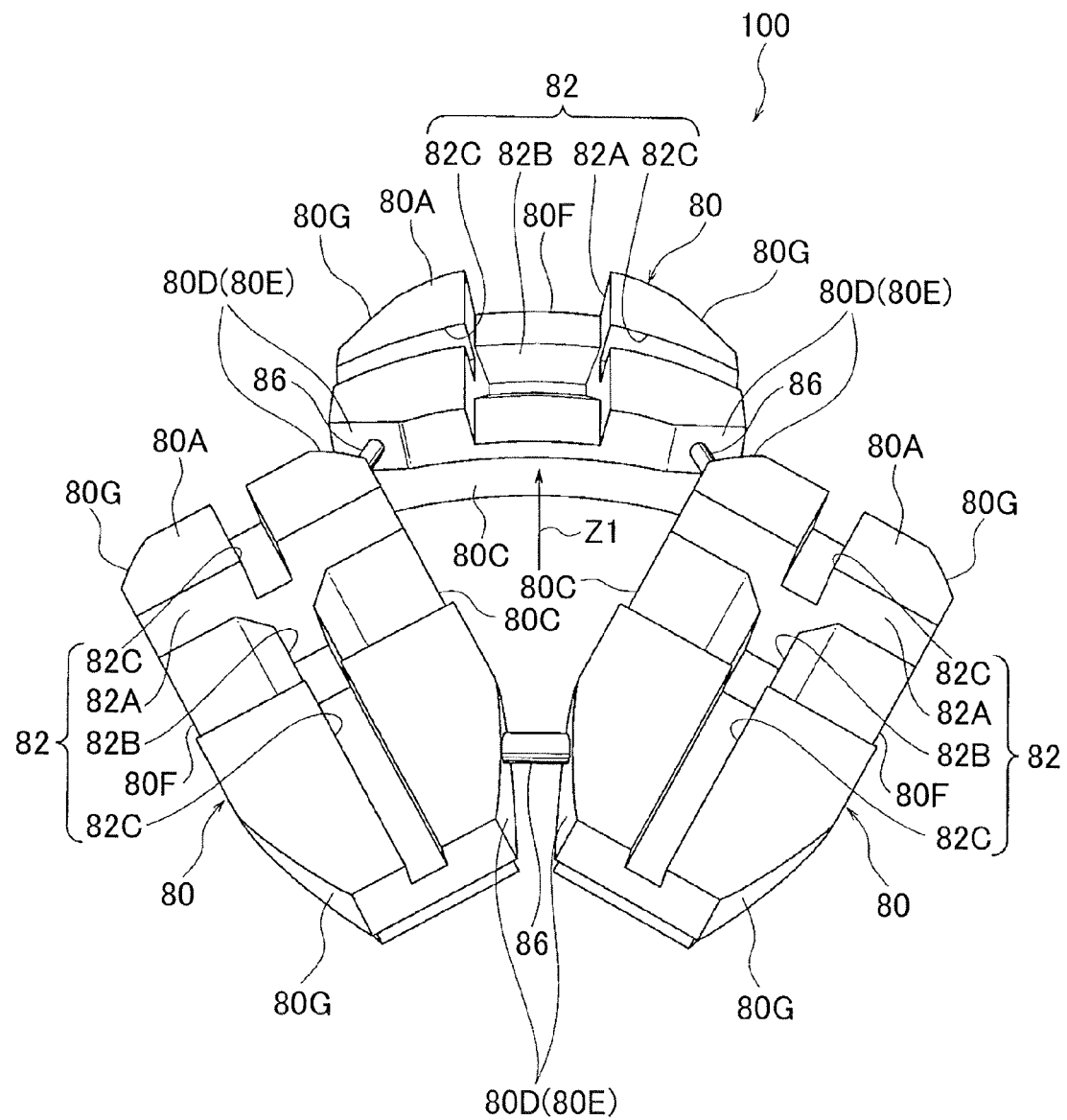
FIG. 14 is a perspective view taken from one axial side, showing the vibration dampers, which are molded as a single vibration damper arrangement before assembling of the vibration dampers to the stator.
Figure 15:
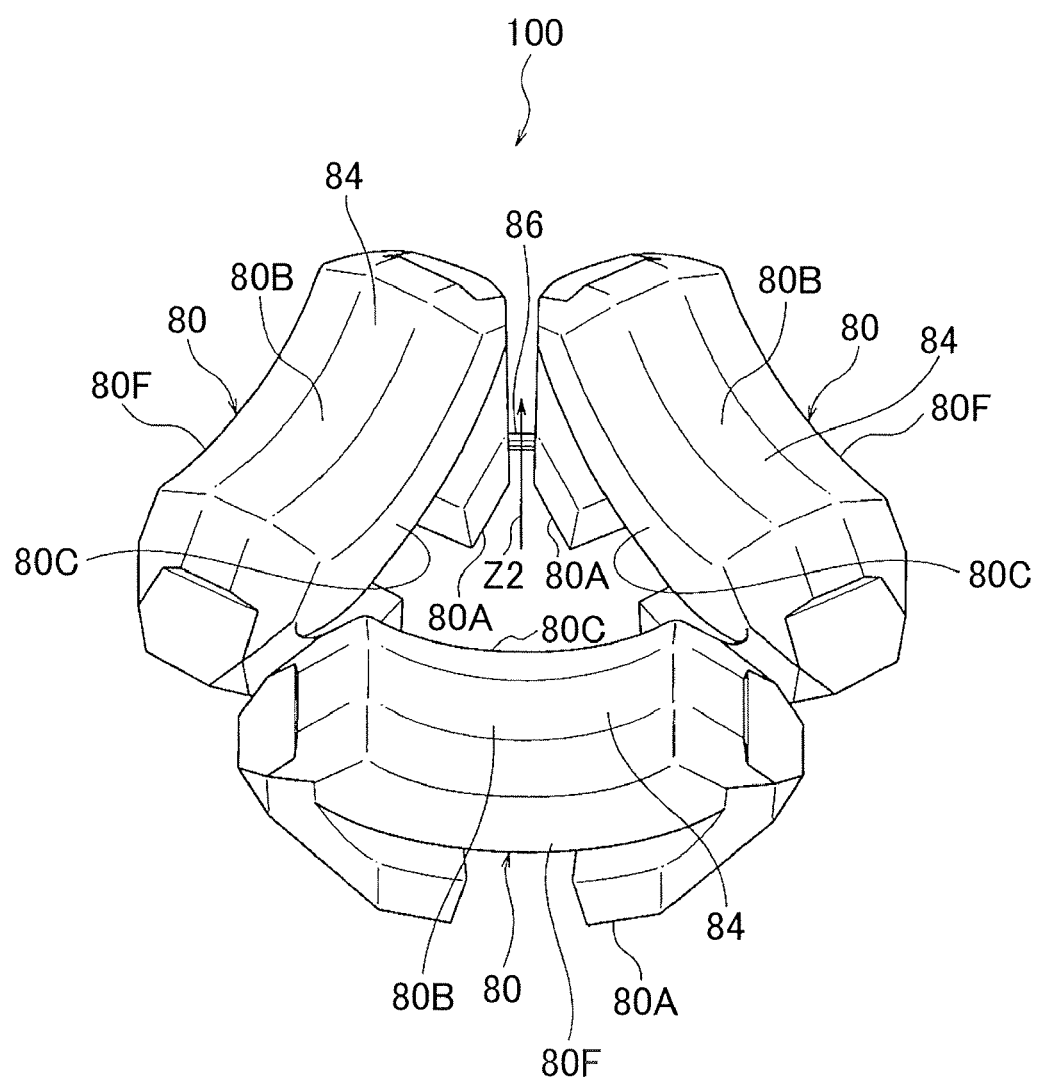
FIG. 15 is a perspective view taken from the other axial side, showing the vibration dampers of the vibration damper arrangement of FIG. 14.

Specifically, as shown in FIGS. 14 and 15, the vibration damper arrangement 100 includes the vibration dampers 80 and a plurality (three in this instance) of cylindrical connectors (cord connectors) 86, each of which interconnects between corresponding circumferentially adjacent two of the vibration dampers 80, so that the vibration dampers 80 and the connectors 86 are alternately connected to form a single closed loop body (single molded body) of the vibration damper arrangement 100. Furthermore, at this time (i.e., upon the completion of the molding process), the outer peripheral portion 80A of each vibration damper 80 is directed toward one axial side (see an arrow Z1 in FIG. 14) in the axial direction of the vibration damper arrangement 100, and the inner peripheral portion 80B of each vibration damper 80 is directed toward the other axial side (see an arrow Z2 in FIG. 15) in the axial direction of the vibration damper arrangement 100.

Furthermore, two corners 80D of an top portion 80C of each vibration damper 80 are chamfered to limit interference in a state before the assembling of the vibration damper arrangement 100 to the stator 18. Here, it should be noted that the top portion 80C is a portion of the vibration damper 80 that should be placed at the top side (upper end side) of the vibration damper 80 upon the assembling of the vibration damper 80 to the stator 18 (see FIG. 22). A surface 80E of each corner 80D of each vibration damper 80 is connected to a surface 80E of the corresponding corner 80D of the circumferentially adjacent one of the vibration dampers 80 through the connector 86.

Two corners 80G of a bottom portion 80F of each vibration damper 80 are chamfered in a manner similar to that of the corners 80D of the top portion 80C of the vibration damper 80. The bottom portion 80F is a portion of the vibration damper 80 that should be placed at the bottom side (lower end side) of the vibration damper 80 upon the assembling of the vibration damper 80 to the stator 18 and is axially opposed to the top portion 80C of the vibration damper 80.

The brushless motor 10 of the second embodiment is manufactured, for instance, in the following manner.

Figure 16:
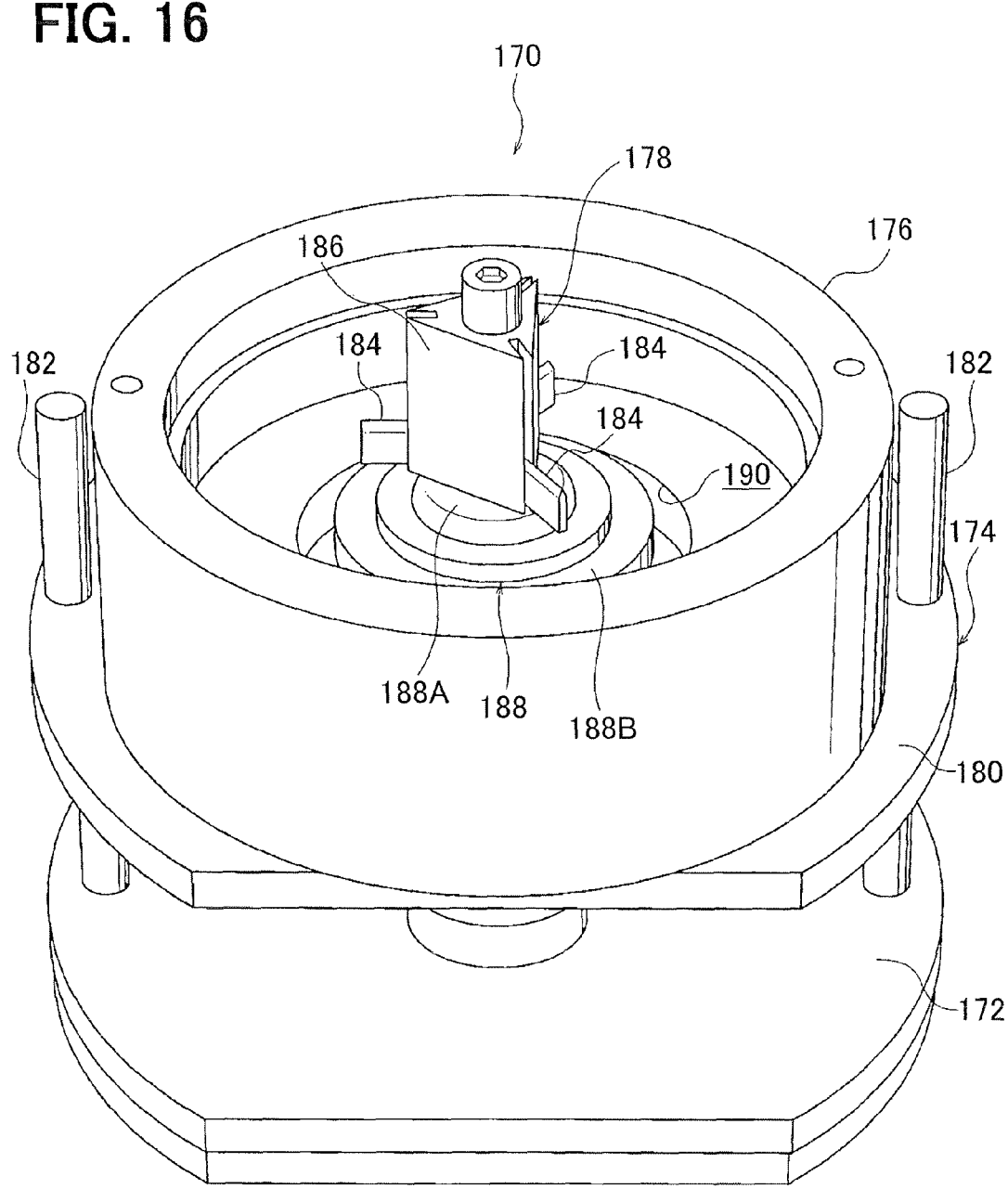
FIG. 16 is a perspective view showing an assembling jig of the second embodiment.
Figure 17:
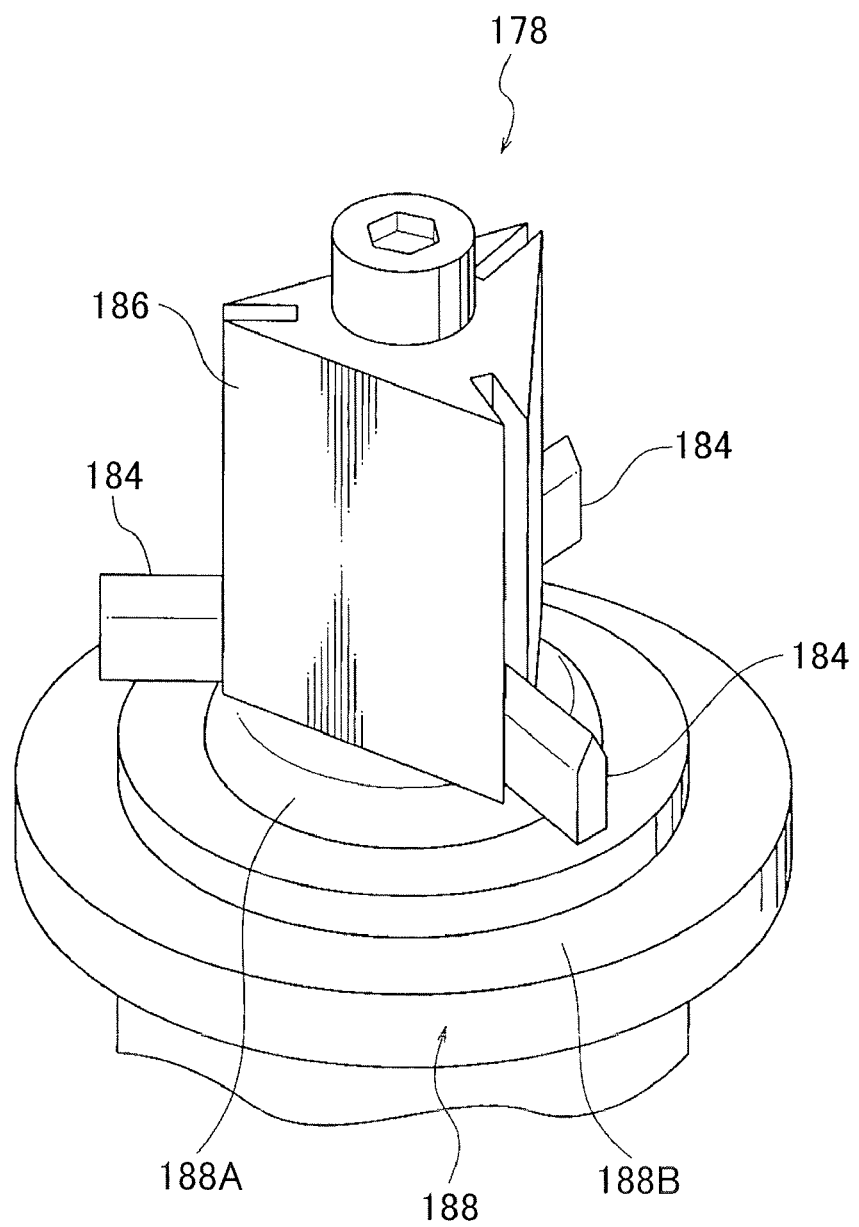
FIG. 17 is a partial enlarged view showing a cutting mechanism of the assembling jig of FIG. 16.

In this instance, the assembling of the brushless motor 10 will be described with reference to a case where an assembling jig 170 shown in FIGS. 16 and 17 is used. The assembling jig 170 is used to assemble the stator 18, the vibration damper arrangement 100 (the vibration dampers 80) and the centerpiece 24 together. The assembling jig 170 includes a base plate 172, a slide mechanism 174, a holding member 176 and a cutting mechanism 178.

The slide mechanism 174 includes a slide plate 180 and two supporting rods 182. The slide plate 180 is opposed to the base plate 172 in an axial direction of the supporting rods 182. The supporting rods 182 extend in a direction generally perpendicular to the base plate 172 and support the slide plate 180 in such a manner that the slide plate 180 is displaceable along the supporting rods 182 toward and away from the base plate 172.

The holding member 176 is configured into an annular form and is fixed on the slide plate 180. The cutting mechanism 178 includes a plurality (three in this instance) of blades 184, a holder 186 and a mount member 188. The holder 186 holds the blades 184. The mount member 188 is axially placed below the blades 184.

The cutting mechanism 178 extends through a hole 190 of the slide plate 180 at a location radially inward of the holding member 176. When the slide plate 180 is displaced upward or downward, the cutting mechanism 178 is displaced relative to the slide plate 180 and the holding member 176 in a top-to-bottom direction (axial direction). The mount member 188 includes a mount surface 188A and a stopper surface 188B. The mount surface 188A is formed as a convex surface that is upwardly convex toward the upper side. The stopper surface 188B is placed radially outward of the mount surface 188A and is configured as an annular planar surface, which extends in a plane generally perpendicular to the axial direction.

The assembling process of the stator 18, the vibration damper arrangement 100 and the centerpiece 24 using the assembling jig 170 is as follows.

Figure 18:
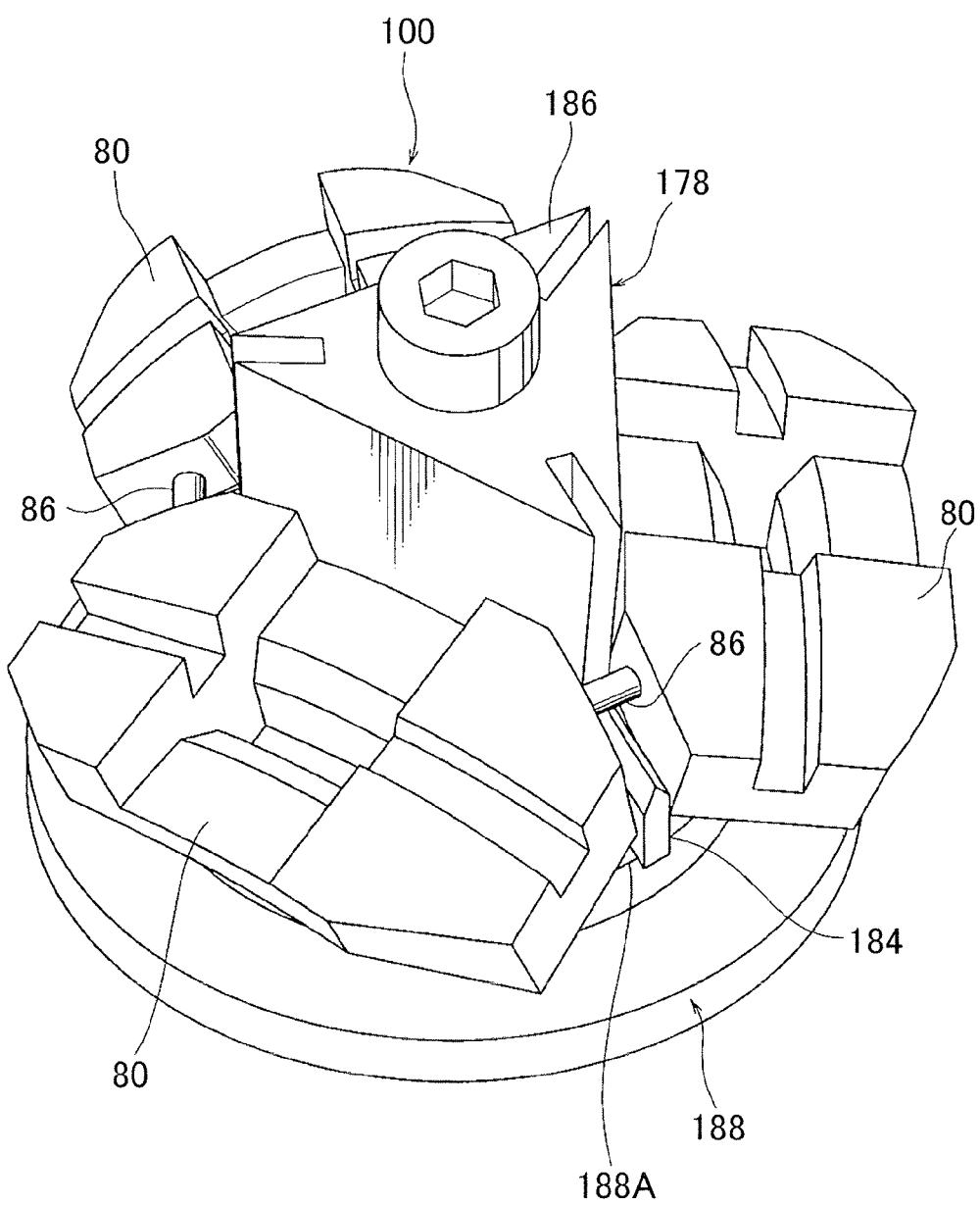
FIG. 18 is a partial enlarged perspective view showing the vibration damper arrangement set on the cutting mechanism of the assembling jig of FIG. 16.

Specifically, first of all, as shown in FIG. 18, the vibration damper arrangement 100 in the form of the single molded body is placed on the mount member 188. At this time, the vibration damper arrangement 100 is circumferentially positioned relative to the cutting mechanism 178 such that each of the blades 184 is opposed to a corresponding one of the connectors 86 in the top-to-bottom direction (axial direction). In this state, each blade 184 is spaced away from the corresponding connector 86.

Figure 19:
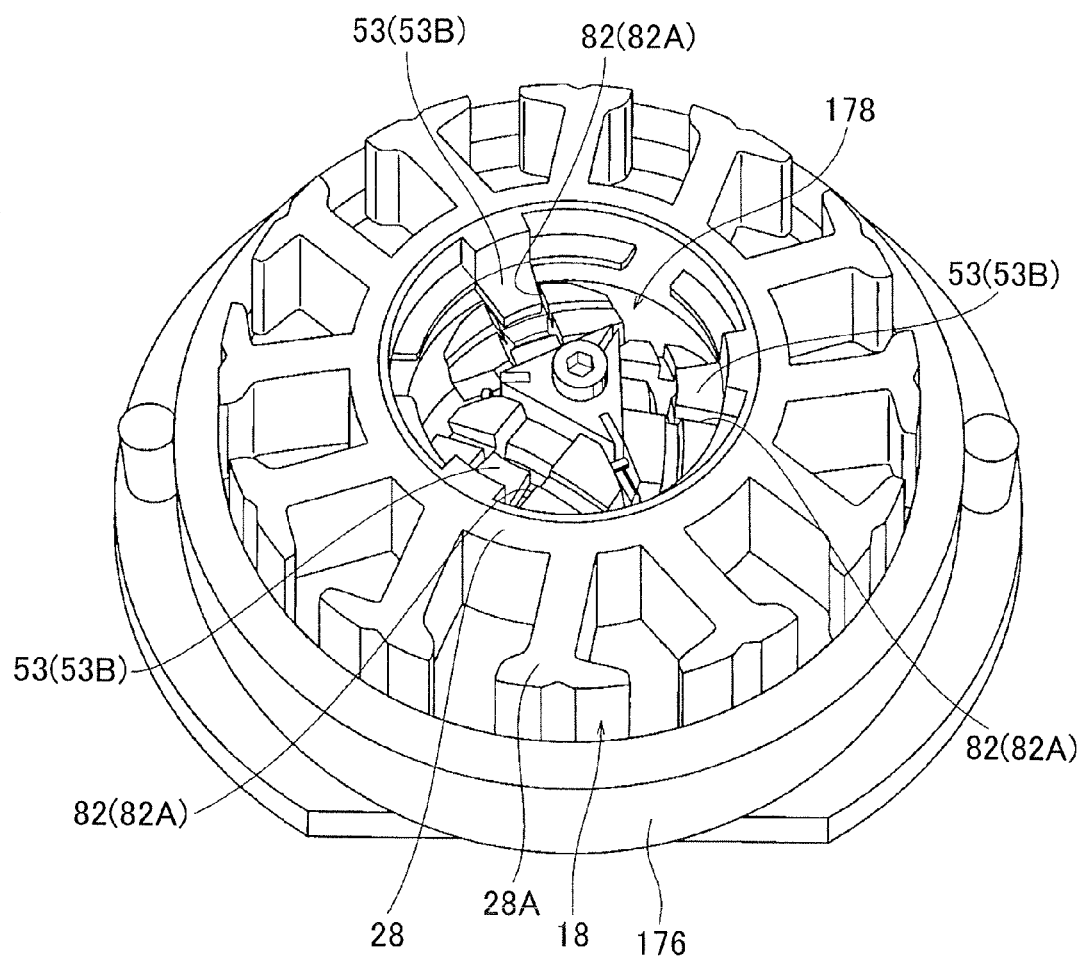
FIG. 19 is a partial enlarged perspective view showing the stator, the vibration damper arrangement and the centerpiece set on the assembling jig of FIG. 16.

Then, as shown in FIG. 19, in the state where the holding member 176 is placed above the cutting mechanism 178, the stator 18 is placed over and is held by the holding member 176. At this time, the stator 18 is circumferentially positioned relative to the holding member 176 such that the projection 53B of each primary engaging portion 53 of the stator core 28 is radially aligned with the primary recess 82A of the primary engaging portion 82 of the corresponding vibration damper 80 of the vibration damper arrangement 100. Although not depicted in FIG. 19 for the sake of simplicity, it should be noted that the stator 18 should be in its complete state where the stator coils 30 (see FIG. 1) are wound around the teeth 28A of the stator core 28.

Figure 20:
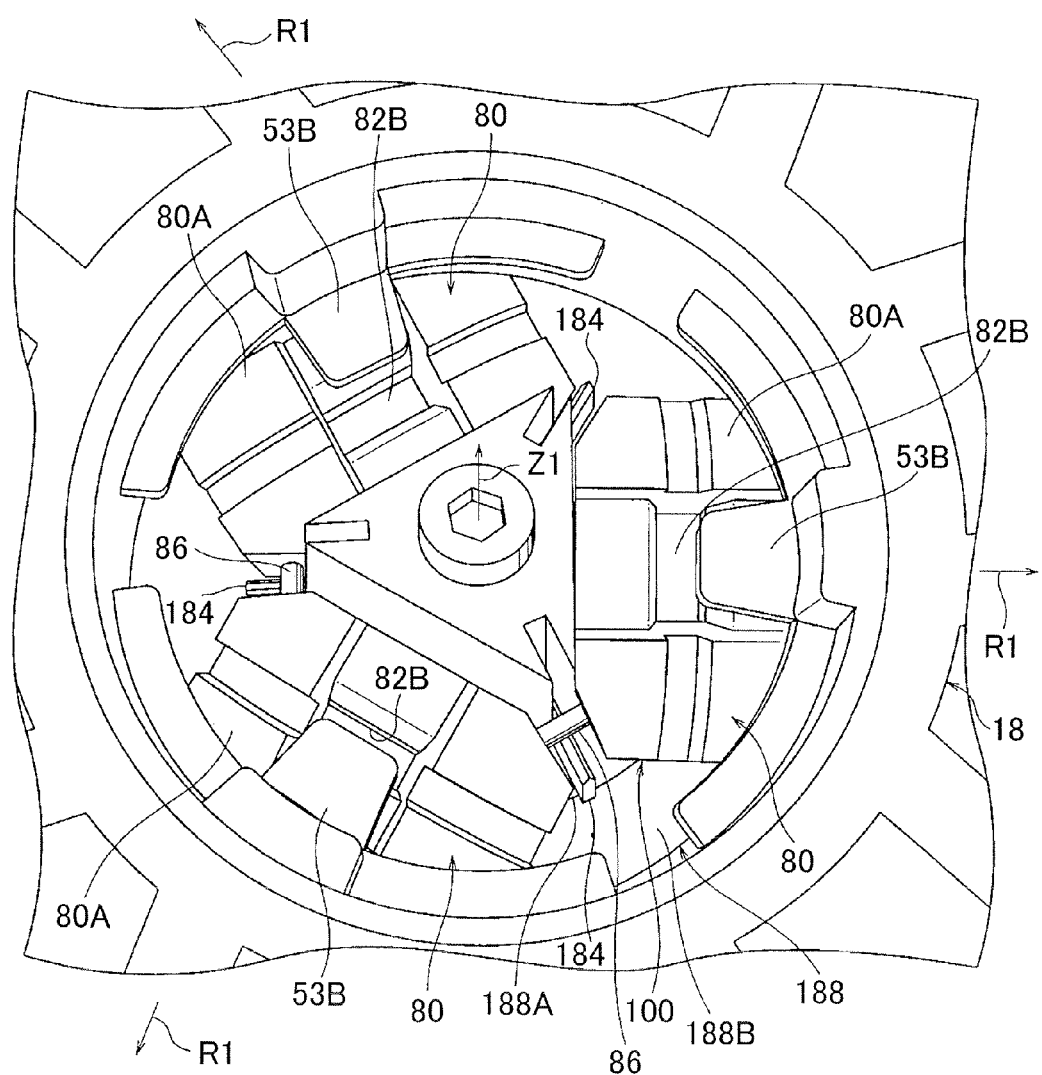
FIG. 20 is a partial enlarged perspective view showing a state where the cutting mechanism is moved toward the one axial side of the vibration damper arrangement from the state shown in FIG. 19.
Figure 21:
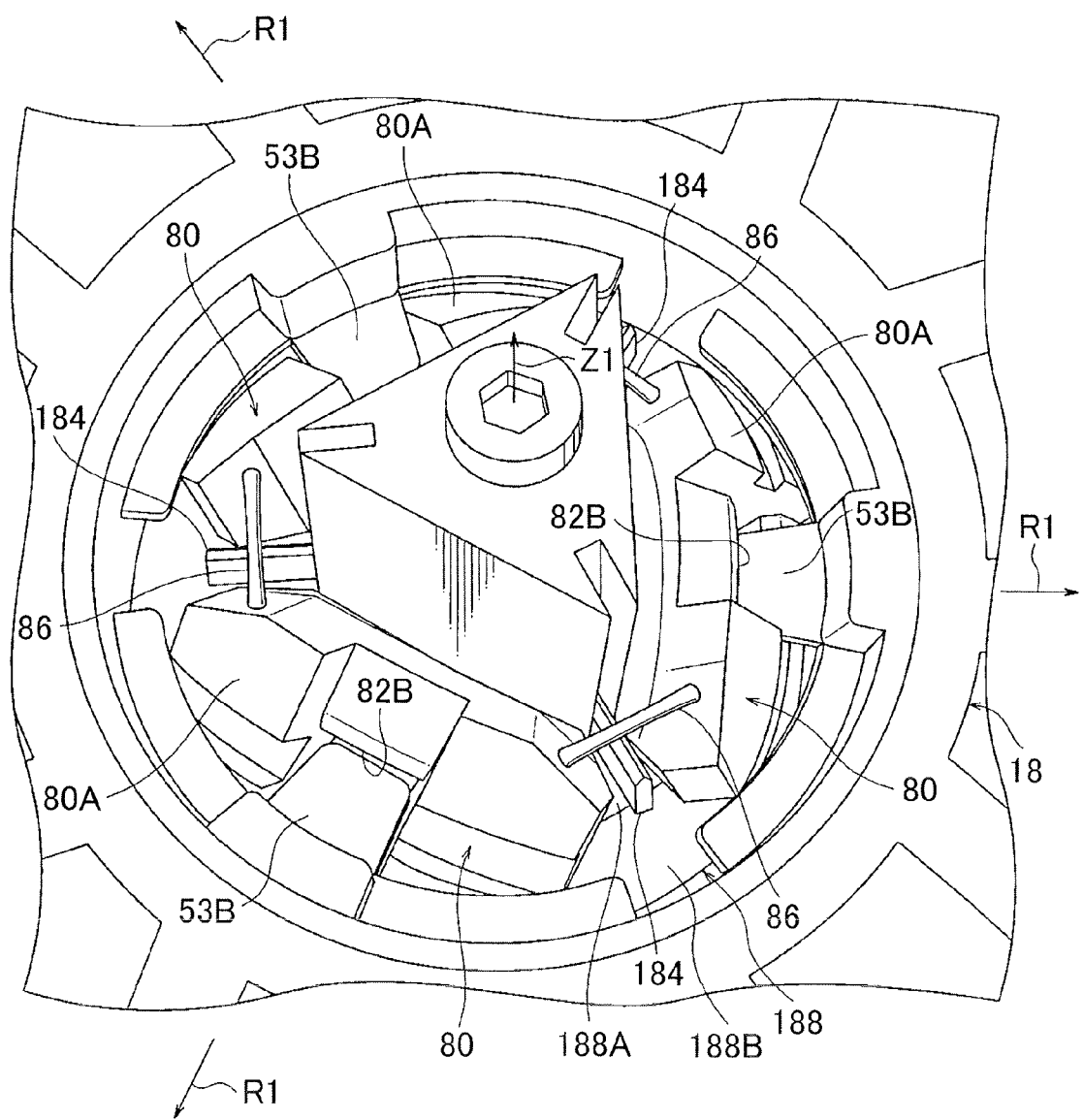
FIG. 21 is a partial enlarged perspective view showing another state where the cutting mechanism is further moved toward the one axial side of the vibration damper arrangement from the state shown in FIG. 20.

Next, with reference to FIGS. 20 and 21, the stator 18 is lowered together with the holding member 176 (see FIG. 19), so that the vibration damper arrangement 100 is placed radially inward of the stator 18. In this way, in the state where each vibration damper 80 is supported from the lower side by the mount surface 188A of the mount member 188, which is upwardly convex, the projection 53B of each primary engaging portion 53 of the stator core 28 contacts a peripheral part of the opening of the groove 82B of the primary engaging portion 82 of the corresponding vibration damper 80. Thereafter, the vibration dampers 80 are rotated (pivoted) about the connectors 86 such that the outer peripheral portion 80A of each vibration damper 80 is radially outwardly turned, i.e., the orientation (position) of the outer peripheral portion 80A of each vibration damper 80 is shifted from the one axial side (side indicated by the arrow Z1) of the vibration damper arrangement 100 to the radially outer side (the side indicated by an arrow R1) of the vibration damper arrangement 100.

Furthermore, at the time of rotating the vibration dampers 80 about the connectors 86, each of the connectors 86 is pulled in its longitudinal direction by the adjacent rotating vibration dampers 80 and is thereby expanded in its longitudinal direction, and the corresponding blade 184 progressively approaches the connector 86.

Figure 22:
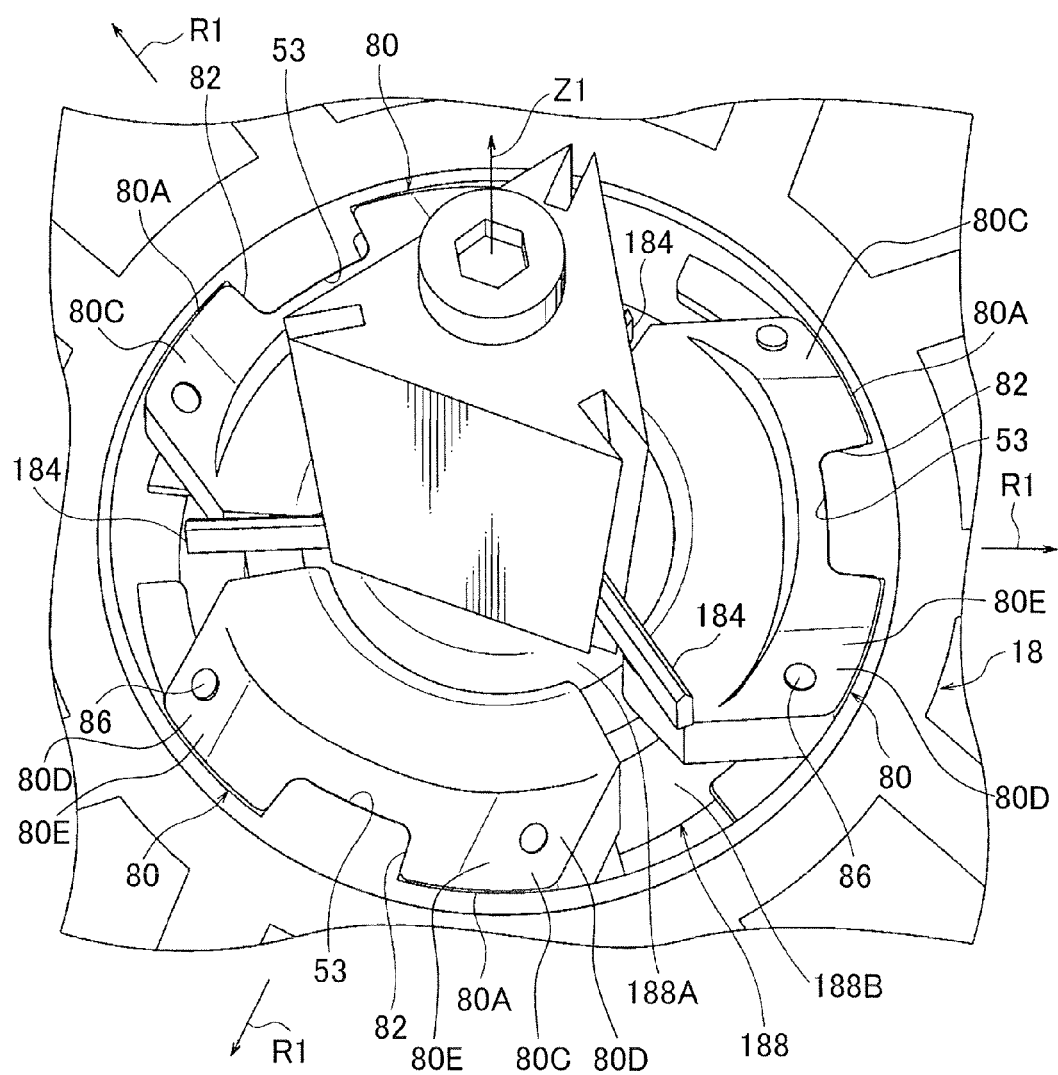
FIG. 22 is a partial enlarged perspective view showing another state where the cutting mechanism is further moved toward the one axial side of the vibration damper arrangement from the state shown in FIG. 21 to cut each connection between corresponding circumferentially adjacent two of the vibration dampers.

As shown in FIG. 22, when the stator 18 is further lowered together with the holding member 176 (see FIG. 19), each vibration damper 80 is placed in a 90 degree rotated state, and thereby the outer peripheral portion 80A of each vibration damper 80 is directed radially outward in the radial direction of the vibration damper arrangement 100.

At this time, an outer diameter of the mount surface 188A is set to be larger than an inner diameter of the vibration damper arrangement 100 (i.e., a diameter of an imaginary circle defined by arcuate inner peripheral edges of the inner peripheral portions 80B of the vibration dampers 80). In this way, it is possible to limit interference between the mount surface 188A and each vibration damper 80. Furthermore, when each vibration damper 80 contacts the stopper surface 188B of the mount member 188, the downward movement of the holding member 176 and the stator 18 is limited.

In the 90 degree rotated state of each vibration damper 80, each primary engaging portion 53 of the stator core 28 and the primary engaging portion 82 of the corresponding vibration damper 80 are engaged with each other, i.e., the primary protrusion 53A, the projection 53B and the secondary protrusions 53C of the primary engaging portion 53 are respectively engaged with the primary recess 82A, the groove 82B and the secondary recesses 82C of the primary engaging portion 82 (see FIGS. 12 to 15). In this way, the vibration dampers 80 are assembled to the stator 18 in such a manner that the vibration dampers 80 are not movable relative to the stator 18 in both of the circumferential direction and the axial direction. This is an end of a first assembling process (installing process), in which the vibration damper arrangement 100 is assembled to, i.e., is installed to the stator 18.

Furthermore, each of the blades 184 passes the corresponding gap defined between corresponding circumferentially adjacent two of the vibration dampers 80 to cut the corresponding connector 86 between the adjacent vibration dampers 80 substantially simultaneously with the assembling of the vibration damper arrangement 100 to the stator 18 (more specifically, substantially simultaneously with the rotating of the vibration dampers 80 about the adjacent connectors 86). Thereby, the vibration damper arrangement 100 is divided into the multiple vibration dampers 80. This is an end of a dividing process (separating process), in which the connectors 86 are cut to separate the vibration dampers 80 from each other.

Alternatively, each connector 86 may be cut with the blade 184 after the completion of the engagement between each primary engaging portion 53 of the stator core 28 and the primary engaging portion 82 of the corresponding vibration damper 80 (i.e., after the completion of the assembling of the vibration damper arrangement 100 to the stator 18). Further alternatively, each connector 86 may be cut with the blade 184 before the completion of the engagement between each primary engaging portion 53 of the stator core 28 and the primary engaging portion 82 of the corresponding vibration damper 80 (i.e., before the completion of the assembling of the vibration damper arrangement 100 to the stator 18). In the case where each connector 86 is cut with the blade 184 before the completion of the engagement between each primary engaging portion 53 of the stator core 28 and the primary engaging portion 82 of the corresponding vibration damper 80, the time point immediately before the cutting of each connector 86 with the blade 184 is the end of the first assembling process.

Figure 23:
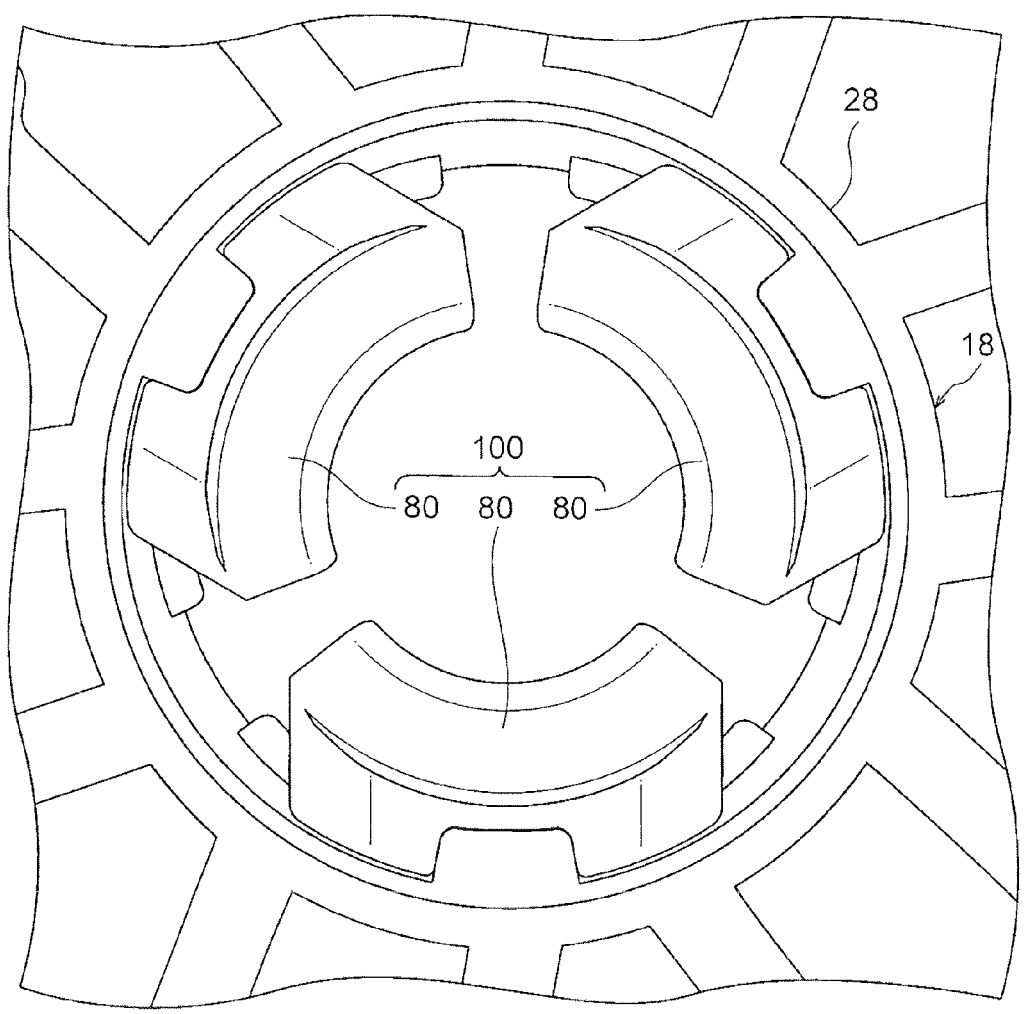
FIG. 23 is a partial enlarged plan view showing the stator of the second embodiment, to which the vibration dampers are assembled and from which the assembling jig is removed.

Next, as shown in FIG. 23, the stator 18, to which the vibration dampers 80 are assembled, is removed from the assembling jig 170 (see FIG. 16).

Then, as shown in FIG. 12, the tubular portion 40 of the centerpiece 24 is inserted at the location radially inward of the vibration dampers 80, and the secondary engaging portions 59 of the tubular portion 40 are engaged to the secondary engaging portions 84 of the vibration dampers 80 held in the stator 18. In this way, each centerpiece 24 is assembled to the stator 18 and the vibration dampers 80 in such a manner that the centerpiece 24 is not movable in the circumferential direction. This is an end of a second assembling process (installing process), in which the centerpiece 24 is assembled to, i.e., is installed to the stator 18 and the vibration dampers 80.

Thereafter, the motor housing 12, the end housing 14, the bearings 50, 51, the rotatable shaft 22 and the rotor housing 32 are integrally assembled to the thus formed assembly of the stator 18, the vibration dampers 80 and the centerpiece 24 (i.e., the motor main body 16) in the manner shown in FIG. 1. Thereby, the manufacturing of the brushless motor 10 is completed.

In the above embodiment, the assembling method is described for the case where each primary engaging portion 53 of the stator core 28 and the secondary engaging portion 84 of each vibration damper 80 are formed to be protruded, and the primary engaging portion 82 of each vibration damper 80 and each secondary engaging portion 59 of the tubular portion 40 are formed to be recessed. Alternatively, the assembling method discussed above may be similarly applied for a case where each primary engaging portion 53 of the stator core 28 and the secondary engaging portion 84 of each vibration damper 80 are formed to be recessed, and the primary engaging portion 82 of each vibration damper 80 and each secondary engaging portion 59 of the tubular portion 40 are formed to be protruded.

Next, advantages of the second embodiment will be described.

According to the manufacturing method of the brushless motor 10 discussed above, the vibration damper arrangement 100, which is used in this manufacturing method, is formed as the single molded body, which includes the multiple vibration dampers 80 connected together by the connectors 86 in the closed loop form (single closed loop body). Here, it should be noted that the closed loop form of the vibration dampers 80 and the connectors 86 is not necessarily circular and can be any shape, such as a polygonal shape (e.g., a triangular shape), an oblong shape, as long as the loop of the vibration dampers 80 and the connectors 86 is closed. This vibration damper arrangement 100 is divided into the multiple vibration dampers 80 by cutting the connectors 86 upon the assembling of the vibration damper arrangement 100 to the stator 18. Therefore, in comparison to a case where the vibration dampers 80 are initially formed as the individual separate vibration dampers 80 before the assembling of the vibration dampers 80 to the stator 18, the number of the assembling steps can be reduced or minimized, and the time required to, for example, stock the vibration dampers 80 at the factory can be reduced or minimized. Therefore, it is possible to reduce or minimize the costs.

Furthermore, in the first assembling process, when the vibration dampers 80 are rotated about the connectors 86 such that the outer peripheral portion 80A of each vibration damper 80 is radially outwardly turned, i.e., the orientation (position) of the outer peripheral portion 80A of each vibration damper 80 is shifted from the one axial side (the side indicated by the arrow Z1) of the vibration damper arrangement 100 to the radially outer side (the side indicated by the arrow R1) of the vibration damper arrangement 100, each connector 86, which connects between the corresponding adjacent vibration dampers 80 at the one axial side, is pulled and is held in the expanded state. Therefore, in the dividing process executed thereafter, the connectors 86 can be easily cut.

Furthermore, each connector 86 is placed at the corresponding position of the vibration damper 80, at which a remaining cut end (stub) of the connector 86 does not interfere with the other components upon the completion of the assembling of the brushless motor 10 (see FIG. 22). Therefore, it is not required to perform a finishing process to trim the remaining cut end (stub) of the connector 86.

Furthermore, in the first assembling step, the vibration damper arrangement 100 is assembled to the stator 18 in the state where the outer peripheral portion 80A of each vibration damper 80 is directed toward the one axial side of the vibration damper arrangement 100. The vibration damper arrangement 100 is originally molded to have the outer peripheral portion 80A of the vibration damper 80 directed toward the one axial side of the vibration damper arrangement 100 to avoid the interference between the vibration dampers 80. Therefore, even at the time of simultaneously assembling the multiple vibration dampers 80 to the stator 18, it is possible to limit the interference between the vibration dampers 80.

Furthermore, in order to engage between the primary engaging portion 82 of each vibration damper 80 and the corresponding primary engaging portion 53 of the stator core 28, it is only required to rotate the multiple vibration dampers 80 about the connectors 86 to change the orientation of the outer peripheral portion 80A of each vibration damper 80 from the one axial side of the vibration damper arrangement 100 to the radially outer side of the vibration damper arrangement 100. Therefore, it is possible to achieve a good assembly work efficiency at the time of engaging between the primary engaging portion 82 of each vibration damper 80 and the corresponding primary engaging portion 53 of the stator core 28, and the vibration damper arrangement 100 can be easily assembled to the stator 18.

As discussed above, according to the manufacturing method of the brushless motor 10 discussed above, the multiple vibration dampers 80 can be simultaneously assembled to the stator 18. Furthermore, at the time of assembling the multiple vibration dampers 80 to the stator 18, the multiple vibration dampers 80 can be handled as the single component and can be easily assembled to the stator 18. Therefore, it is possible to use an automatic assembling technique with use of a corresponding assembling machine to assemble the brushless motor 10.

Furthermore, for instance, in a comparative case where there is used a vibration damper arrangement that includes multiple vibration dampers, each of which is molded to have an outer peripheral portion initially directed toward the radially outer side in the radial direction of the vibration damper arrangement, it is possible to eliminate a slidable molding die if a primary engaging portion of the vibration damper is formed as a protrusion. However, if the primary engaging portion of the vibration damper is formed as a recess, like in the case of the vibration damper shown in FIG. 12, the slidable molding die, which is slidable in the radial direction of the vibration damper arrangement, is required. Thereby, the manufacturing costs of the vibration damper arrangement may be disadvantageously increased.

In contrast, according to the manufacturing method of the brushless motor 10 of the second embodiment, there is used the vibration damper arrangement 100 that is molded to include the multiple vibration dampers 80, each of which has the primary engaging portion 82 in the outer peripheral portion 80A of the vibration damper 80, and the outer peripheral portion 80A is directed toward the one axial side of the vibration damper arrangement 100. Therefore, regardless of whether the primary engaging portion 82 of each vibration damper 80 is formed as the recess or the protrusion, the slidable molding die is not required to mold the primary engaging portion 82 of the vibration damper 80 at the time of molding the vibration damper arrangement 100. Therefore, the manufacturing costs of the vibration damper arrangement 100 can be reduced.

Furthermore, according to the second embodiment, the vibration damper arrangement 100 is molded such that the primary engaging portion 82 and the secondary engaging portion 84 are formed in the outer peripheral portion 80A and the inner peripheral portion 80B, respectively, of the vibration damper 80, and the outer peripheral portion 80A and the inner peripheral portion 80B of the vibration damper 80 are directed toward the one axial side (the arrow Z1) and the other axial side (the arrow Z2), respectively, in the axial direction of the vibration damper arrangement 100. Therefore, this vibration damper arrangement 100 can be molded by using upper and lower molding dies, which are adapted to be displaceable in the top-to-bottom direction (the axial direction of the vibration damper arrangement 100). Therefore, it is possible to further reduce the manufacturing costs of the vibration damper arrangement 100.

In the second embodiment, it is preferred that the assembling of the stator 18, the vibration damper arrangement 100 and the centerpiece 24 is automatically performed by using the assembling jig 170 and the corresponding assembling machine. Alternatively, the assembling of the stator 18, the vibration damper arrangement 100 and the centerpiece 24 may be manually performed with hands of a factory assembly worker by using the assembling jig 170.

The manufacturing method of the second embodiment is equally applicable to the first embodiment. Specifically, in place of the vibration dampers 80 of the second embodiment, the vibration dampers 26 of the first embodiment may be used. In such a case, connectors, which are similar to the connectors 86 of the second embodiment, should be provided to the vibration dampers 26 of the first embodiment at the time of molding the vibration damper arrangement 100 of the first embodiment. In this way, in addition to the advantages discussed in the second embodiment, the advantages discussed in the first embodiment can be implemented. Also, each of the vibration dampers 80 of the second embodiment may be modified such that the two circumferential end portions 83 of the vibration damper 80 are replaced with the two circumferential end portions 62 of the vibration damper 26 of the first embodiment to implement the corresponding advantages discussed in the first embodiment.

Figure 24:
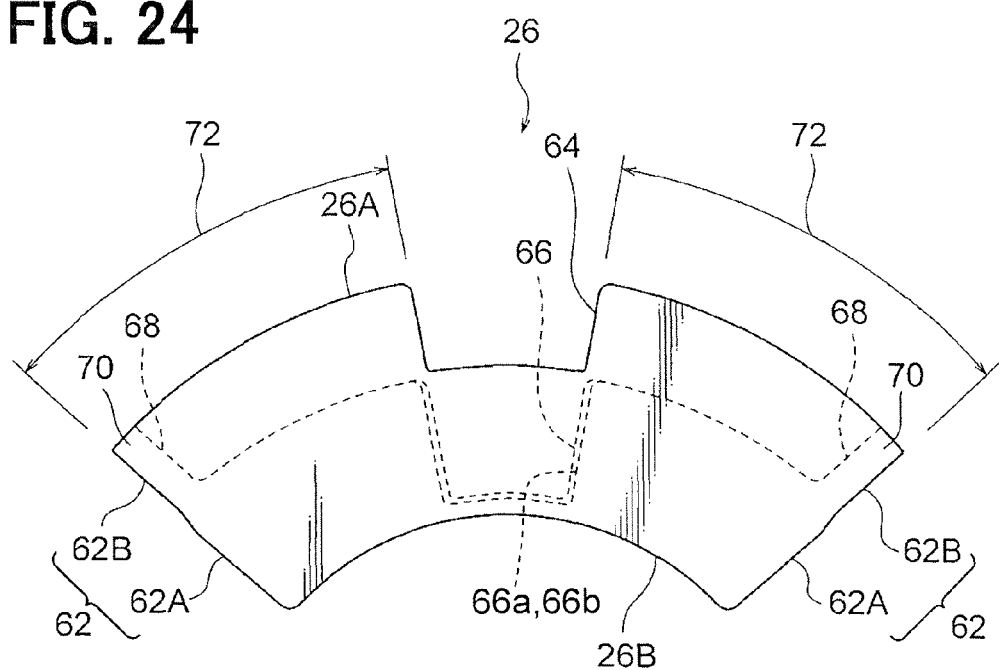
FIG. 24 is a diagram similar to FIG. 4, showing a modification of the first embodiment.
Figure 25:
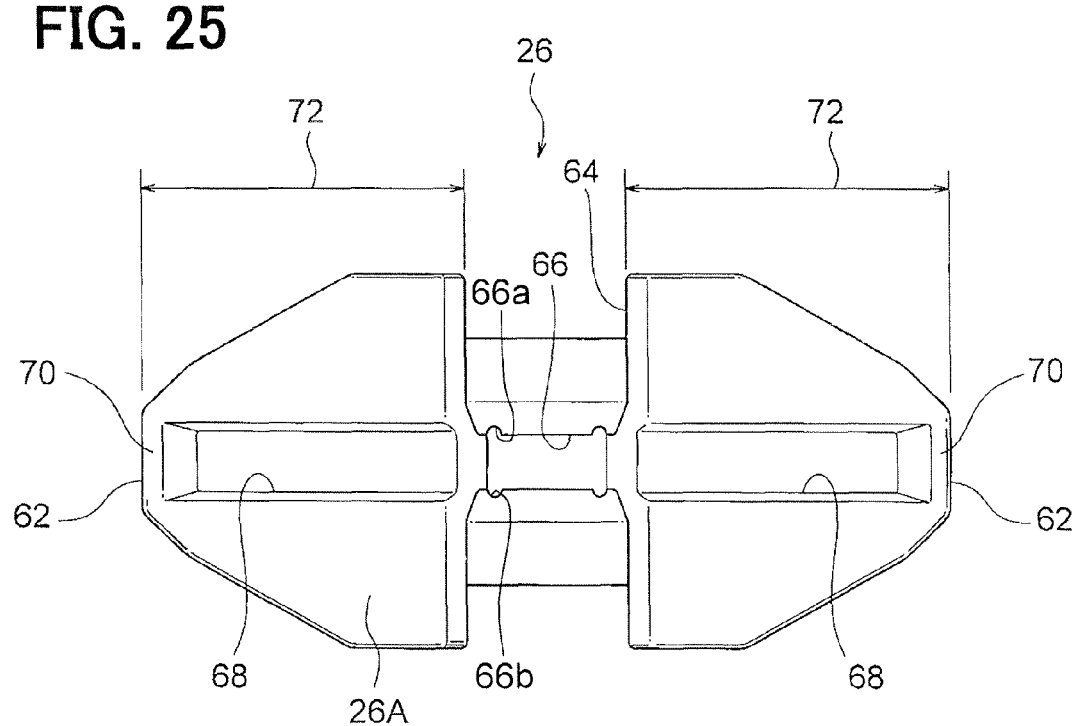
FIG. 25 is a diagram similar to FIG. 5, showing the modification shown in FIG. 24.

Furthermore, the vibration dampers 26 of the first embodiment may be modified in a manner shown in FIGS. 24 and 25. The vibration damper 26 of FIGS. 24 and 25 is substantially the same as that of FIGS. 4 and 5 except presence of first and second accommodation recesses 66a, 66b in the groove 66. As shown in FIGS. 24 and 25, each of the first and second accommodation recesses 66a, 66b is axially recessed from the corresponding inner surface of the groove 66 axially away from the projection 58 and continuously extends along an upper or lower side outer peripheral edge of the projection 58 to have a generally U-shaped configuration upon the installation of the vibration damper 26 to the stator core 28. Furthermore, as shown in FIG. 25, at the groove 66, the first and second accommodation recesses 66a, 66b are opposed to each other in the axial direction such that the first accommodation recess 66a extends along the upper side outer peripheral edge of the projection 58, while the second accommodation recess 66b extends along the lower side outer peripheral edge of the projection 58 upon the installation of the vibration damper 26 to the stator core 28.

The first and second accommodation recesses 66a, 66b of FIGS. 24 and 25 are provided to accommodate burrs that are left upon press-working of the stator core 28, which is formed as the laminated core, with a cutting die. That is, at the time of manufacturing the stator core 28, the magnetic sheets (iron steel sheets) are laminated one after another in the axial direction to form the laminated core, and this laminated core is configured into the shape shown in FIG. 3 by cutting with the cutting die, which is axially applied to the laminated core. At this time, burrs are likely left along the upper or lower side outer peripheral edge of each projection 58 depending on the applied direction of the cutting die against the laminated core. When these burrs are left in the projection 58 and contact the vibration damper 26, these burrs may possibly result in a damage (e.g., cracking, rupturing) in the vibration damper 26. Particularly, the upper and lower portions of the vibration damper 26, which are axially adjacent to the projection 58, are axially clamped by the bearing receiving portions 48, 49, respectively, as shown in FIG. 1. When the clamping force is applied to the burrs of the projection 58, the burrs will damage the vibration damper 26. Each of the first and second accommodation recesses 66a, 66b is sized to receive these burrs while limiting the contact of the burrs to the surface of the accommodation recess 66a, 66b. Therefore, it is possible to limit the damage to the vibration damper 26 by the burrs, thereby enabling the implementation of the required damping performance of the vibration damper 26. Here, it should be noted that it is possible to provide only one of the first and second accommodation recesses 66a, 66b at each groove 66, depending on a need. Also, the first and second accommodation recesses 66a, 66b may be applied to the groove 82B of each of the vibration dampers 80 of the second embodiment.

Additional advantages and modifications will readily occur to those skilled in the art. The invention in its broader terms is therefore not limited to the specific details, representative apparatus, and illustrative examples shown and described.

What is claimed is:

1. A brushless motor comprising:
   a rotatable shaft;
   a rotor that is supported by the rotatable shaft to rotate integrally with the rotatable shaft;
   a centerpiece that includes a tubular support portion, which rotatably supports the rotatable shaft, and a plurality of outer protrusions, which radially outwardly protrude from the tubular support portion and are circumferentially arranged one after another;
   a stator that is located radially outward of the tubular support portion and is configured into an annular form, wherein the stator includes a plurality of primary protrusions, each of which radially inwardly protrudes from an inner peripheral portion of the stator in a radial direction of the stator and is placed at a circumferential center location between corresponding circumferentially adjacent two of the plurality of outer protrusions of the centerpiece in a circumferential direction of the stator; and
   a plurality of vibration dampers, each of which is radially placed between the stator and the tubular support portion of the centerpiece in the radial direction of the stator and is circumferentially placed between corresponding two of the plurality of outer protrusions of the centerpiece in the circumferential direction of the stator, wherein each of the plurality of vibration dampers is made of an elastomer material and includes:
      an outer peripheral portion, which is arcuately curved in the circumferential direction of the stator and is radially opposed to the inner peripheral portion of the stator in the radial direction of the stator;
      first and second circumferential end portions, which are provided at first and second circumferential ends, respectively, of the outer peripheral portion and are opposed to each other in the circumferential direction of the stator, wherein at least a part of each of the first and second circumferential end portions is engaged with a corresponding one of the plurality of outer protrusions of the centerpiece in the circumferential direction of the stator; and
      a primary recess, which is radially inwardly recessed from an outer peripheral surface of the outer peripheral portion of the vibration damper and is engaged with a corresponding one of the plurality of primary protrusions of the stator in the circumferential direction of the stator.

2. The brushless motor according to claim 1, wherein:
   each of the plurality of outer protrusions of the centerpiece includes a main engaging portion and an auxiliary engaging portion at each of first and second circumferential side walls of the outer protrusion, which are opposed to each other in the circumferential direction of the stator, and the main engaging portion and the auxiliary engaging portion of each of the first and second circumferential side walls are placed one after another in the radial direction of the stator; and each of the first and second circumferential end portions of each of the plurality of vibration dampers includes:
- a main engaging portion, which is engaged with the main engaging portion of a corresponding one of the first and second circumferential side walls of a corresponding one of the plurality of outer protrusions of the centerpiece in the circumferential direction of the stator; and
- an auxiliary engaging portion, which is circumferentially spaced from the auxiliary engaging portion of the corresponding one of the first and second circumferential side walls of the corresponding outer protrusion, wherein the auxiliary engaging portion of each of the first and second circumferential end portions of the vibration damper is adapted to be engaged with the auxiliary engaging portion of the corresponding one of the first and second circumferential side walls of the corresponding outer protrusion in the circumferential direction of the stator when a load, which is applied from the stator to the vibration damper, is equal to or larger than a predetermined value.

3. The brushless motor according to claim 1, wherein:
the stator further includes a plurality of secondary protrusions, each of which radially inwardly protrudes from the inner peripheral portion of the stator in the radial direction of the stator and circumferentially extends at a corresponding circumferential location that is between a corresponding one of the plurality of primary protrusions and a corresponding adjacent one of the plurality of outer protrusions of the centerpiece;

each of the plurality of vibration dampers further includes at least one secondary recess, which is radially inwardly recessed in the outer peripheral portion of the vibration damper and is engaged with a corresponding one of the plurality of secondary protrusions of the stator in an axial direction of the stator along a circumferential extent of the corresponding secondary protrusion.

4. The brushless motor according to claim 3, wherein:
each of the plurality of primary protrusions of the stator includes a projection, which radially inwardly projects from the rest of the primary protrusion in the radial direction of the stator; and the primary recess of each of the plurality of vibration dampers includes a groove, which is engaged with the projection of the corresponding primary protrusion of the stator in the axial direction of the stator.

5. The brushless motor according to claim 3, wherein each of the plurality of vibration dampers includes first and second stopper portions, which are formed at the first and second circumferential end portions, respectively, of the vibration damper and each of which is interposed between a corresponding one of the plurality of outer protrusions of the centerpiece and a corresponding one of the plurality of secondary protrusions of the stator.

6. The brushless motor according to claim 1, wherein:
the rotor is placed radially outward of the stator in the radial direction of the stator and includes at least one rotor magnet that extends in the circumferential direction of the stator;

the tubular support portion includes a bearing receiving portion, which receives a bearing that rotatably supports the rotatable shaft;

a first radial gap is formed between an inner peripheral portion of the at least one rotor magnet and an outer peripheral portion of the stator;

a second radial gap is formed between a corresponding one of the plurality of the outer protrusions of the centerpiece and the inner peripheral portion of the stator; and a third radial gap is formed between the bearing receiving portion and a corresponding one of the plurality of primary protrusions of the stator; and the first radial gap, the second radial gap and the third radial gap are set to satisfy at least one of the following conditions:
- the first radial gap is larger than the second radial gap; and
- the first radial gap is larger than the third radial gap.

7. The brushless motor according to claim 6, wherein:
the first radial gap is larger than the second radial gap; and
the first radial gap is larger than the third radial gap.

8. The brushless motor according to claim 7, wherein the second radial gap is equal to the third radial gap.

9. A brushless motor comprising:
a stator that is configured into an annular form and includes a plurality of primary engaging portions;

a vibration damper arrangement that is molded from an elastomer material and is installed to the stator at a location radially inward of the stator, wherein the vibration damper arrangement includes a plurality of vibration dampers, which are arranged one after another in a circumferential direction of the stator, and each of the plurality of vibration dampers includes a primary engaging portion, which is engaged with a corresponding one of the plurality of primary engaging portions of the stator, and a secondary engaging portion; and a centerpiece that includes a tubular portion, which is placed radially inward of the vibration damper arrangement and rotatably supports a rotatable shaft, wherein the tubular portion includes a plurality of secondary engaging portions, each of which is engaged with the secondary engaging portion of a corresponding one of the plurality of vibration dampers, wherein each of the plurality of vibration dampers of the vibration damper arrangement is separated from each circumferentially adjacent one of the plurality of vibration dampers upon cutting of each of a plurality of connectors, which is initially integrally formed with the plurality of vibration dampers to circumferentially join between corresponding circumferentially adjacent two of the plurality of vibration dampers to form a single closed loop body.

10. The brushless motor according to claim 9, wherein:
the vibration damper arrangement is initially molded such that the primary engaging portion of each of the plurality of vibration dampers is formed in an outer peripheral portion of the vibration damper, which is initially directed toward one axial side of the vibration damper arrangement in an axial direction of the vibration damper arrangement; and the primary engaging portion of each of the plurality of vibration dampers is engaged with the corresponding one of the plurality of primary engaging portions of the stator after each of the plurality of vibration dampers is rotated to turn the outer peripheral portion of the vibration damper from the one axial side toward a radially outer side in a radial direction of the vibration damper arrangement.

11. The brushless motor according to claim 10, wherein the vibration damper arrangement is initially molded such that the primary engaging portion and the secondary engaging portion of each of the plurality of vibration dampers are formed in the outer peripheral portion and an inner peripheral portion, respectively, of the vibration damper, and the outer peripheral portion and the inner peripheral portion of the vibration damper are directed toward the one axial side and the other axial side, respectively, in the axial direction of the vibration damper arrangement.

12. The brushless motor according to claim 10, wherein the vibration damper arrangement is initially molded such that each of the plurality of connectors joins between one axial end parts of corresponding circumferentially adjacent two of the plurality of vibration dampers, which are located on the one axial side of the vibration damper arrangement.

13. A manufacturing method of a brushless motor, comprising:

installing a vibration damper arrangement, which is integrally molded from an elastomer material and includes a plurality of vibration dampers and a plurality of connectors alternately joined one after another to form a single closed loop body, to a stator, which is configured into an annular form, at a location radially inward of the stator such that a primary engaging portion of each of the plurality of vibration dampers is engaged with a corresponding one of a plurality of primary engaging portions of the stator;

separating the plurality of vibration dampers of the vibration damper arrangement from each other by cutting each of the plurality of connectors in a state where the vibration damper arrangement is held by the stator; and installing a centerpiece to the stator and the vibration damper arrangement by inserting a tubular portion of the centerpiece, which is adapted to rotatably support a rotatable shaft, at a location radially inward of the plurality of vibration dampers and by engaging each of a plurality of secondary engaging portions of the tubular portion of the centerpiece to a secondary engaging portion of a corresponding one of the plurality of vibration dampers after the separating of the plurality of vibration dampers.

14. The manufacturing method according to claim 13, further comprising molding the vibration damper arrangement from the elastomer material before the installing of the vibration damper arrangement such that the primary engaging portion of each of the plurality of vibration dampers is formed in an outer peripheral portion of the vibration damper, which is directed toward one axial side of the vibration damper arrangement in an axial direction of the vibration damper arrangement upon the molding of the vibration damper arrangement but before the installing of the vibration damper arrangement, wherein the installing of the vibration damper arrangement includes rotating each of the plurality of vibration dampers about corresponding adjacent two of the plurality of connectors to turn the outer peripheral portion of the vibration damper from the one axial side toward a radially outer side in a radial direction of the vibration damper arrangement, so that the primary engaging portion of the vibration damper is engaged with the corresponding one of the plurality of primary engaging portions of the stator.

15. The manufacturing method according to claim 14, wherein the molding of the vibration damper arrangement includes molding each of the plurality of vibration dampers such that the primary engaging portion and the secondary engaging portion of the vibration damper are formed in the outer peripheral portion and an inner peripheral portion, respectively, of the vibration damper, and the outer peripheral portion and the inner peripheral portion of the vibration damper are directed toward the one axial side and the other axial side, respectively, in the axial direction of the vibration damper arrangement.

16. The manufacturing method according to claim 14, wherein the molding of the vibration damper arrangement includes molding the plurality of connectors such that each of the plurality of connectors joins between one axial end parts of corresponding circumferentially adjacent two of the plurality of vibration dampers, which are located on the one axial side of the vibration damper arrangement.

* * * * *